(12) United States Patent
Jeon

(10) Patent No.: US 10,685,650 B2
(45) Date of Patent: Jun. 16, 2020

(54) MOBILE TERMINAL AND METHOD OF CONTROLLING THE SAME

(71) Applicant: LG ELECTRONICS INC., Seoul (KR)

(72) Inventor: Hyunjoo Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 109 days.

(21) Appl. No.: 15/858,731

(22) Filed: Dec. 29, 2017

(65) Prior Publication Data

US 2019/0027140 A1    Jan. 24, 2019

(30) Foreign Application Priority Data

Jul. 18, 2017   (KR) ........................ 10-2017-0091160

(51) Int. Cl.
| | |
|---|---|
| *G10L 15/08* | (2006.01) |
| *G10L 15/22* | (2006.01) |
| *G06F 3/0488* | (2013.01) |
| *G06K 9/00* | (2006.01) |
| *G10L 15/18* | (2013.01) |
| *G06F 16/583* | (2019.01) |
| *G06F 16/435* | (2019.01) |
| *G10L 15/26* | (2006.01) |
| *G10L 25/48* | (2013.01) |

(52) U.S. Cl.
CPC ............ *G10L 15/22* (2013.01); *G06F 3/0488* (2013.01); *G06F 3/04883* (2013.01); *G06F 16/435* (2019.01); *G06F 16/5846* (2019.01); *G06K 9/00771* (2013.01); *G10L 15/1815* (2013.01); *G10L 15/26* (2013.01); *G10L 25/48* (2013.01)

(58) Field of Classification Search
USPC .................................... 704/231, 251, 252, 9
See application file for complete search history.

(56) References Cited

U.S. PATENT DOCUMENTS

| | | | | |
|---|---|---|---|---|
| 8,521,531 | B1* | 8/2013 | Kim ........................ | G10L 15/22 704/252 |
| 9,479,730 | B1* | 10/2016 | Noll ........................ | H04N 7/181 |
| 10,424,298 | B2* | 9/2019 | Fuchiwaki .............. | G06F 3/167 |
| 2007/0135043 | A1* | 6/2007 | Hayes .................... | H04M 1/677 455/26.1 |
| 2009/0024392 | A1* | 1/2009 | Koshinaka .............. | G10L 15/06 704/257 |
| 2012/0036556 | A1* | 2/2012 | LeBeau ................... | G06F 3/048 726/3 |
| 2012/0084076 | A1* | 4/2012 | Boguraev ............. | G06F 40/274 704/9 |
| 2015/0100157 | A1* | 4/2015 | Houssin ................. | B25J 9/1694 700/246 |

(Continued)

*Primary Examiner* — Seong-Ah A Shin
(74) *Attorney, Agent, or Firm* — Birch, Stewart, Kolasch & Birch, LLP

(57) ABSTRACT

A mobile terminal including a touch screen; a microphone configured to receive voice information from a user; and a controller configured to analyze the voice information using a voice recognition algorithm, extract a term predicted to be unfamiliar to the user from the analyzed voice information based on a pre-stored knowledge database, search for information on the extracted term based on a context of the analyzed voice information, and display the searched information to the touch screen.

18 Claims, 14 Drawing Sheets

(56) References Cited

U.S. PATENT DOCUMENTS

| | | | |
|---|---|---|---|
| 2015/0120300 A1* | 4/2015 | Maruta | G06F 3/167 |
| | | | 704/251 |
| 2015/0187351 A1* | 7/2015 | Moon | G10L 15/22 |
| | | | 704/231 |
| 2016/0178389 A1* | 6/2016 | Hainzlmaier | G01C 21/3644 |
| | | | 701/467 |
| 2017/0161367 A1* | 6/2017 | Kemp | G06F 40/295 |
| 2017/0178626 A1* | 6/2017 | Gruber | G06F 16/9537 |
| 2017/0220581 A1* | 8/2017 | Wade | G06Q 20/102 |
| 2018/0089172 A1* | 3/2018 | Needham | G06F 40/263 |
| 2018/0267955 A1* | 9/2018 | Catalano | G06F 40/242 |
| 2019/0116137 A1* | 4/2019 | Senftleber | H04L 51/14 |

\* cited by examiner

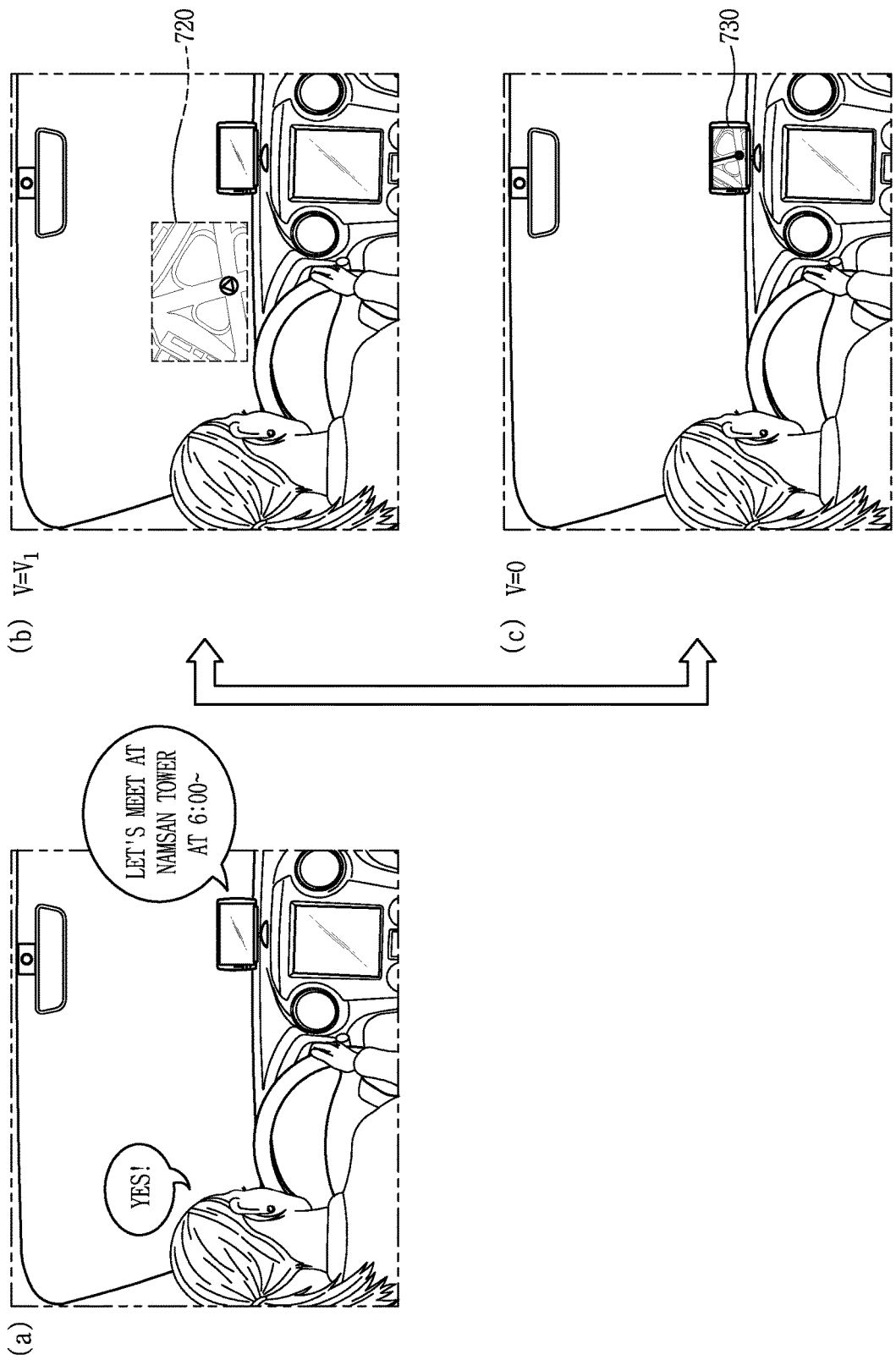

MOBILE TERMINAL AND METHOD OF CONTROLLING THE SAME

CROSS-REFERENCE TO RELATED APPLICATION

Pursuant to 35 U.S.C. § 119(a), this application claims the benefit of an earlier filing date of and the right of priority to Korean Application No. 10-2017-0091160, filed on Jul. 18, 2017, the contents of which are incorporated by reference herein in its entirety.

BACKGROUND OF THE INVENTION

1. Field of the Invention

This specification relates to a mobile terminal which provides a smart search service, and a method for controlling the same.

2. Background of the Invention

Terminals can be generally classified as mobile/portable terminals or stationary terminals. Mobile terminals can also be classified as handheld terminals or vehicle mounted terminals.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs. Efforts are ongoing to support and increase the functionality of mobile terminals. Such efforts include software and hardware improvements, as well as changes and improvements in the structural components.

Recently, an artificial intelligence technique for similar thinking to humans is being actively developed based on a machine learning technique. Such an artificial intelligence technique enables machines to replace the conventional human behaviors which manipulate machines through human thinking. Accordingly, various research to utilize such an artificial intelligence is ongoing in various industrial fields.

SUMMARY OF THE INVENTION

Therefore, an aspect of the detailed description is to provide a mobile terminal capable of providing information required by a user to a proper position at a proper time.

To achieve these and other advantages and in accordance with the purpose of this specification, as embodied and broadly described herein, there is provided a mobile terminal, including: a touch screen configured to display visual information; a microphone configured to receive voice information; and a controller configured to analyze the voice information using a voice recognition algorithm, configured to extract a term predicted to be unfamiliar to a user from the analyzed voice information based on a pre-stored knowledge database, configured to search information on the extracted term based on a context of the analyzed voice information, and configured to output the searched information to the touch screen.

To achieve these and other advantages and in accordance with the purpose of this specification, as embodied and broadly described herein, there is also provided a method for controlling a mobile terminal, including: receiving voice information; analyzing the voice information using a voice recognition algorithm; extracting a term predicted to be unfamiliar to a user from the analyzed voice information based on a pre-stored knowledge database; searching information on the extracted term based on a context of the analyzed voice information; and outputting the searched information.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 7A to 7C are conceptual views showing a method for effectively providing information related to an unfamiliar term, to a proper position at a proper time, according to user's situation information.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
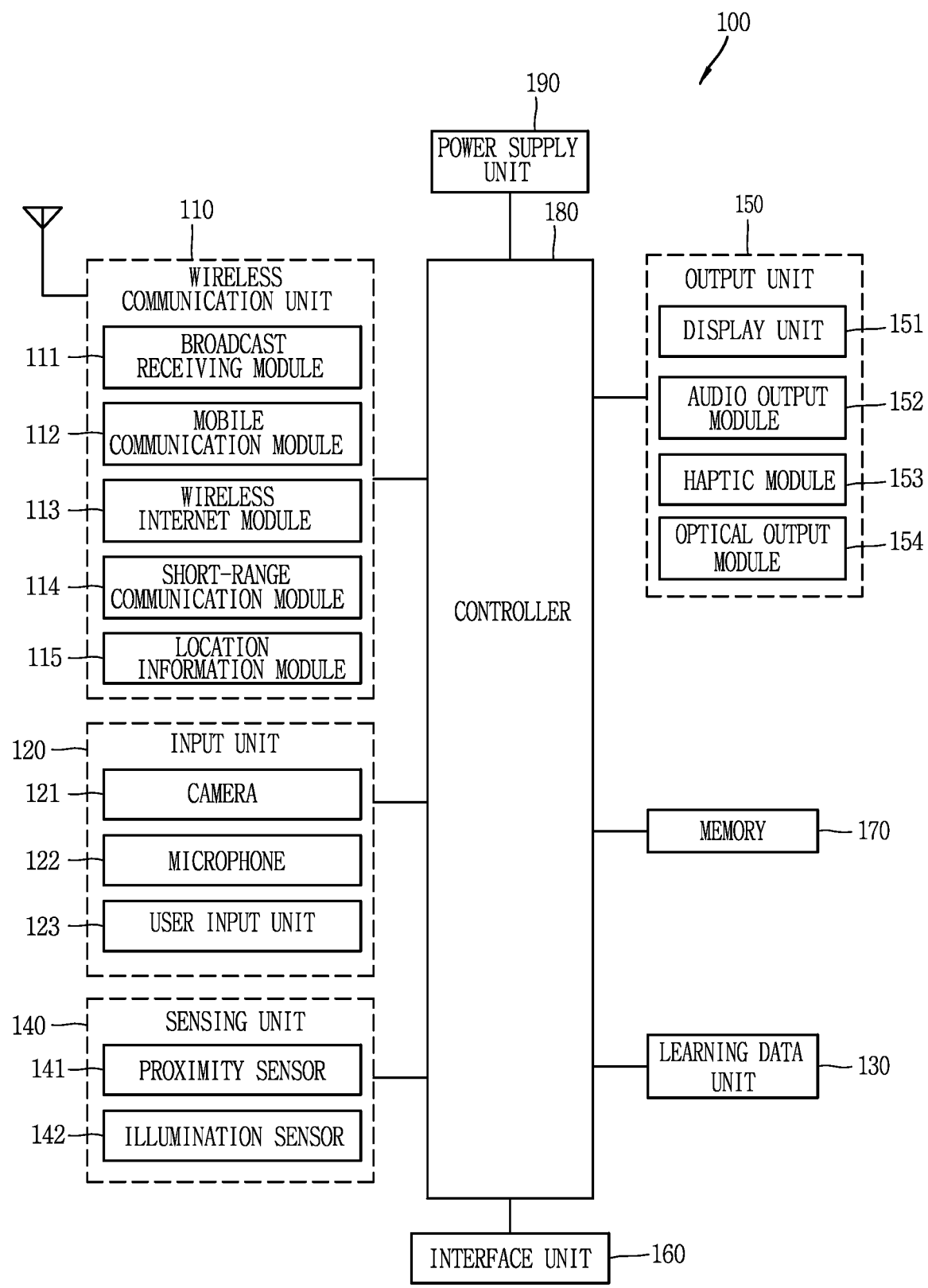
FIG. 1A is a block diagram illustrating a mobile terminal according to an embodiment of the present invention.
Figure 1B:
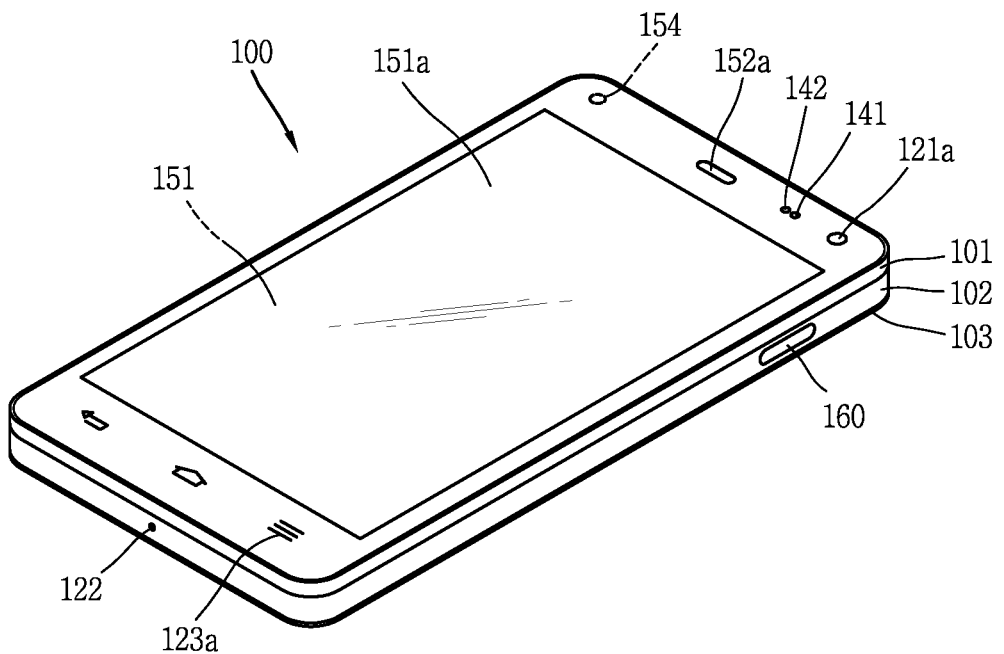
FIGS. 1B and 1C are conceptual views illustrating an example of a mobile terminal according to an embodiment of the present invention, which are viewed from different directions.
Figure 1C:
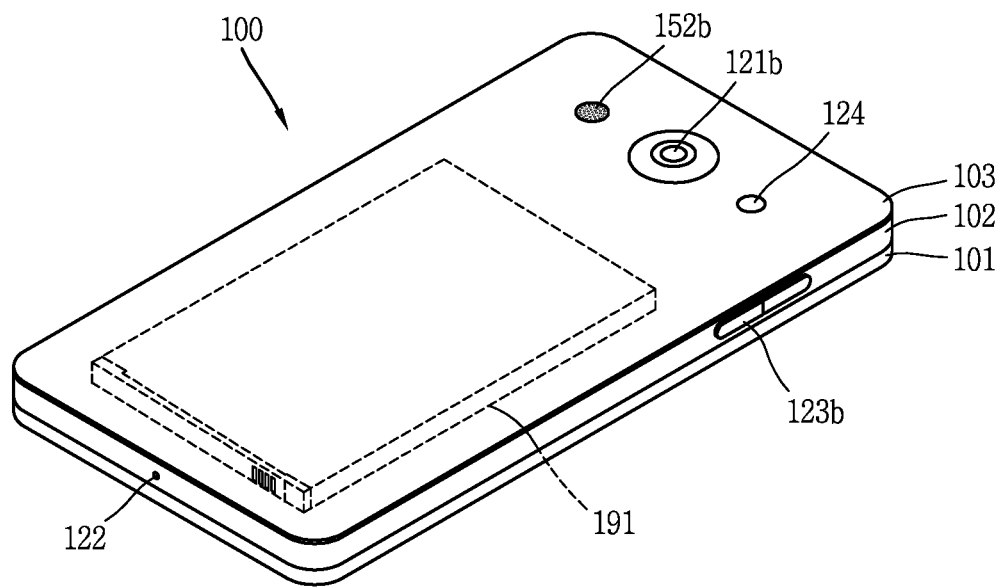

Reference is now made to FIGS. 1A-IC, where FIG. 1A is a block diagram of a mobile terminal in accordance with the present disclosure, and FIGS. 1B and 1C are conceptual views of one example of the mobile terminal, viewed from different directions. The mobile terminal 100 is shown having components such as a wireless communication unit 110, an input unit 120, a learning data unit 130, a sensing unit 140, an output unit 150, an interface unit 160, a memory 170, a controller 180, and a power supply unit 190. Implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The artificial intelligence unit 130 plays a role of processing information based on an artificial intelligence technology and may include at least one module for performing at least one of learning of information, inference of information, perception of information, and processing of a natural language. For example, the artificial intelligence unit 130 can include a graphic processing unit (GPU) performing parallel data processing.

The artificial intelligence unit 130 can use a machine learning technology to execute at least one of learning, inference and processing of a large amount of information (big data), such as information stored in the electronic device, surrounding environment information related to the electronic device, information stored in a communication-available external storage, etc. And the artificial intelligence unit 130 can predict (infer, guess, decide) at least one executable operation of the electronic device based on the information learned using the machine learning technology, and control the electronic device to execute the most feasible operation among the at least one predicted operation.

The machine learning technology is a technology that collects and learns a large amount of information based on at least one algorithm, and determines and predicts information based on the learned information. The learning of information is an operation of grasping characteristics of information, rules and judgment criteria, quantifying a relation between information and information, and predicting new data using the quantified patterns.

Algorithms used by the machine learning technology may be algorithms based on statistics, for example, a decision tree that uses a tree structure type as a prediction model, an artificial neural network that mimics neural network structures and functions of living creatures, genetic programming based on biological evolutionary algorithms, clustering of distributing observed examples to a subset of clusters, a Monte Carlo method of computing function values as probability using randomly-extracted random numbers, and the like.

As one field of the machine learning technology, deep learning is a technology of performing at least one of learning, determining, and processing information using the artificial neural network algorithm. The artificial neural network may have a structure of linking layers and transferring data between the layers. This deep learning technology may be employed to learn vast amounts of information through the artificial neural network using a graphic processing unit (GPU) optimized for parallel computing.

The artificial intelligence unit 130 can collect (sense, monitor, extract, detect, receive) signals, data and information input or output among components of the electronic device, in order to collect vast amounts of information for applying the machine learning technology. The collection of information can be understood as a term including an operation of sensing information through a sensor, extracting information stored in the memory 170, or receiving information from an external storage through communication. Also, the artificial intelligence unit 130 can collect data, information and the like stored in an external storage (for example, cloud server) connected through communication.

The artificial intelligence unit 130 can sense information within the electronic device, surrounding environment information related to the electronic device, and user information through the sensing unit 140. In addition, the artificial intelligence unit 130 can receive broadcast signals and/or broadcast-related information, wireless signals, wireless data, and the like through the wireless communication unit 110. The artificial intelligence unit 130 can also receive image information (or signal), audio information (or signal), data, or user-input information from an input unit.

The artificial intelligence unit 130 can process the learned information into an appropriate form. The processed information may be stored in the memory 170 in a form of knowledge graph, command policy, personalization database, dialog engine, etc. The artificial intelligence unit 130 can control components of the electronic device to execute a predicted operation or transfer a control command for executing the predicted operation to the controller 180, based on the learned information.

Also, the artificial intelligence unit 130 and the controller 180 can be understood as the same component. In this instance, functions executed in the controller 180 described herein may be expressed as being executed in the artificial intelligence unit 130, and the controller 180 can be named as the artificial intelligence unit 130, or conversely the artificial intelligence unit 130 can be referred to as the controller 180.

Further, the artificial intelligence unit 130 and the controller 180 can be understood as separate components. In this instance, the artificial intelligence unit 130 and the controller 180 can execute various controls on the electronic device through data exchange with each other. The controller 180 can execute at least one function on the electronic device or control at least one of the components of the electronic device based on results derived from the artificial intelligence unit 130. Furthermore, the artificial intelligence unit 130 can also be operated under the control of the controller 180.

The artificial intelligence unit 130 can be called learning data unit 130. If the artificial intelligence unit 130 is referred to as the learning data unit 130, the artificial intelligence unit 130 is configured to store learned information, and is controllable by the controller 180.

The learning data unit 130 can be configured to receive, categorize, store, and output information to be utilized for data mining, data analysis, intelligent decision making, and machine learning algorithms and techniques. The learning data unit 130 can include one or more memory units configured to store data that is received, detected, sensed, generated, predefined, or otherwise output by the terminal, or received, detected, sensed, generated, predefined, or otherwise output by another component, device, terminal, or entity in communication with the terminal.

The learning data unit 130 can include memory incorporated or implemented at the terminal. In some embodiments, learning data unit 130 can be implemented using memory 170. Alternatively or additionally, the learning data unit 130 can be implemented using memory associated with the terminal, such as an external memory directly coupled to the terminal or memory maintained at a server in communication with the terminal. In other embodiments, the learning data unit 130 can be implemented using memory maintained in a cloud computing environment, or other remote memory location that is accessible by the terminal through a communication scheme, such as a network.

The learning data unit 130 is generally configured to store data in one or more databases to identify, index, categorize, manipulate, store, retrieve, and output the data for use in supervised or unsupervised learning, data mining, predictive analytics, or other machine learning techniques. The information stored at the learning data unit 130 can be utilized by the controller 180, or one or more other controllers of the terminal, using any of a variety of different types of data analysis and machine learning algorithms and techniques.

Examples of such algorithms and techniques include k-Nearest neighbor systems, fuzzy logic (e.g., possibility theory), neural networks, Boltzmann machines, vector quantization, pulsed neural nets, support vector machines, maximum margin classifiers, hill-climbing, inductive logic systems, bayesian networks, petri nets (e.g., finite state machines, mealy machines, moore finite state machines), classifier trees (e.g., perceptron trees, support vector trees, markov trees, decision tree forests, random forests), pandemonium models and systems, clustering, artificially intelligent planning, artificially intelligent forecasting, data fusion, sensor fusion, image fusion, reinforcement learning, augmented reality, pattern recognition, automated planning, and the like.

The controller 180 can request, retrieve, receive, or otherwise utilize the data of the learning data unit 130 to determine or predict at least one executable operation of the terminal based on the information determined or generated using the data analysis and machine learning algorithms and techniques, and control the terminal to execute a predicted or desired operation among the at least one executable operation. The controller 180 can perform various functions implementing emulation of intelligence (i.e., knowledge based systems, reasoning systems, and knowledge acquisition systems); and including systems for reasoning with uncertainty (e.g., fuzzy logic systems), adaptive systems, machine learning systems, artificial neural networks, and the like.

The controller 180 can also include sub-modules to enable its performance and/or execution involving voice and natural speech language processing, such as an I/O processing module, environment condition module, a speech-to-text (STT) processing module, a natural language processing module, a task flow processing module, and a service processing module. Each of these sub-modules may also have access to one or more systems or data and models at the terminal, or a subset or superset thereof, including scheduling, vocabulary index, user data, task flow models, service models, and automatic speech recognition (ASR) systems. In other embodiments, the controller 180 or other aspects of the terminal may be implemented with said sub-modules, systems, or data and models.

In some examples, based on the data at the learning data unit 130, the controller 180 can be configured to perform detecting and sensing a need based on a contextual condition or a user's intent expressed in a user input or natural language input; actively eliciting and/or obtaining information needed to fully determine a need based on the contextual condition or a user's intent (e.g., by analyzing historical data including historical input and output, pattern matching, disambiguating words, input intentions, etc.); determining the task flow for executing a function in response to the need based on the contextual condition or user's intent; and executing the task flow to meet the need based on the contextual condition or user's intent.

In some embodiments, the controller 180 can implement specific hardware elements dedicated for learning data processes including memistors, transconductance amplifiers, pulsed neural circuits, artificially intelligent nanotechnology systems (e.g., autonomous nano machines) or artificially intelligent quantum mechanical systems (e.g., quantum neural networks), and the like. In some embodiments, the controller 180 can include pattern recognition systems such as machine vision systems, acoustic recognition systems, handwriting recognition systems, data fusion systems, sensor fusion systems, and soft sensors. Machine vision systems can also include content based image retrieval, optical character recognition, augmented reality, egomotion, tracking or optical flow, and the like.

The controller 180 can be configured to collect, sense, monitor, extract, detect, and/or receive signals or data, via one or more sensing components at the terminal, in order to collect information for processing and storage at the learning data unit 130 and for use in data analysis and machine learning operations. Collection of information may include sensing information through a sensor, extracting information stored in the memory, such as memory 170, or receiving information from another terminal, entity, or an external storage through communication means. Thus in one example, the controller 180 can collect historical usage information at the terminal, store the historical usage information for use in data analytics, and at a future occurrence, determine a best match for executing a particular function using predictive modeling based on the stored historical usage information.

The controller 180 can also receive or sense information of the surrounding environment, or other information, through the sensing unit 140. In addition, the controller 180 can receive broadcast signals and/or broadcast-related information, wireless signals, wireless data, and the like through the wireless communication unit 110. The controller 180 can also receive image information (or a corresponding signal), audio information (or a corresponding signal), data, or user-input information from an input unit.

The controller 180 can collect information in real time, and process or categorize the information (for example, in a knowledge graph, command policy, personalization database, dialog engine, etc.), and store the processed information in the memory 170 or the learning data unit 130.

When the operation of the terminal is determined based on data analysis and machine learning algorithms and techniques, the controller 180 can control the components of the terminal to execute the determined operation. The controller 180 can then execute the determined operation by controlling the terminal based on the control command.

In some embodiments, when a specific operation is executed, the controller 180 can analyze history information indicating the execution of the specific operation through data analysis and machine learning algorithms and techniques and execute updating of previously-learned information based on the analyzed information. Accordingly, the controller 180, in combination with the learning data unit 130, can improve the accuracy of future performance of the data analysis and machine learning algorithms and techniques based on the updated information.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Wideband CDMA (WCDMA), High Speed Downlink Packet access (HSDPA), Long Term Evolution (LTE), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), Long Term Evolution (LTE), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-Wide Band (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 can include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Hereinafter, a structure of an electronic device 100 according to an embodiment of the present disclosure or the terminal in which the above-described components are disposed will be described with reference to FIGS. 1B and 1C. Referring now to FIGS. 1B and 1C, the electronic device 100 is described with reference to a bar-type terminal body. However, the present disclosure is not limited to this, and may be also applicable to various structures such as a watch type, a clip type, a glasses type, a folder type in which two or more bodies are coupled to each other in a relatively movable manner, a slide type, a swing type, a swivel type, and the like. The following description in association with a specific type of mobile terminal or on a specific type of mobile terminal will be also typically applied to another type of mobile terminal.

The electronic device 100 may include a case (for example, a frame, a housing, a cover, etc.) constituting the appearance thereof. As illustrated in the drawing, the electronic device 100 may include a front case 101 and a rear case 102. Various electronic components may be incorporated into a space formed between the front case 101 and the rear case 102. At least one middle case may be additionally disposed between the front case 101 and the rear case 102

A display unit 151 may be disposed on a front surface of the terminal body to output information. As illustrated, a window 151*a* of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 300 is detached from the rear case 102, the electronic components mounted to the rear case 102 may be externally exposed.

As illustrated, when the rear cover 300 is coupled to the rear case 102, a side surface of the rear case 102 may be partially exposed. In some cases, upon the coupling, the rear case 102 may also be completely shielded by the rear cover 300. In some embodiments, the rear cover 300 may include an opening for externally exposing a camera 121*b* or an audio output module 152*b*.

The cases 101, 102, 103 may be formed by injection-molding synthetic resin or may be formed of a metal, for example, stainless steel (STS), aluminum (Al), titanium (Ti), or the like. Unlike the example which the plurality of cases form an inner space for accommodating such various components, the electronic device 100 may be configured such that one case forms the inner space. In this example, the electronic device 100 having a uni-body formed so synthetic resin or metal extends from a side surface to a rear surface may also be implemented.

Further, the electronic device 100 may include a waterproofing unit for preventing an introduction of water into the terminal body. For example, the waterproofing unit may include a waterproofing member which is located between the window 151*a* and the front case 101, between the front case 101 and the rear case 102, or between the rear case 102 and the rear cover 300, to hermetically seal an inner space when those cases are coupled.

The electronic device 100 may include a display unit 151, first and second audio output modules 152*a* and 152*b*, a proximity sensor 141, an illumination sensor 152, an optical output module 154, first and second cameras 121*a* and 121*b*, first and second manipulation units 123*a* and 123*b*, a microphone 122, an interface unit 160 and the like.

Hereinafter, description will be given of an exemplary electronic device 100 that the display unit 151, the first audio output module 152*a*, the proximity sensor 141, the illumination sensor 142, the optical output module 154, the first camera 121*a* and the first manipulation unit 123*a* are disposed on the front surface of the terminal body, the second manipulation unit 123*b*, the microphone 122 and the interface unit 160 are disposed on a side surface of the terminal body, and the second audio output module 152*b* and the second camera 121*b* are disposed on a rear surface of the terminal body, with reference to FIGS. 1B and 1C.

However, the foregoing configuration is not limited to the arrangement. The foregoing configuration can be excluded, substituted or disposed on another surface if necessary. For example, the first manipulation unit 123*a* may not be disposed on the front surface of the terminal body, and the second audio output module 152*b* may be disposed on the side surface other than the rear surface of the terminal body.

The display unit 151 can display (output) information processed in the electronic device 100. For example, the display unit 151 can display execution screen information of an application program driven in the electronic device 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display. The display unit 151 may be implemented in two or more in number according to a configured aspect of the electronic device 100. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor can sense this touch and the controller 180 can generate a control command corresponding to the touch. The content which is input in the touching manner may be a text or numerical value, or a menu item which can be indicated or designated in various modes.

The touch sensor may be configured in a form of a film having a touch pattern, disposed between the window 151*a* and a display on a rear surface of the window 151*a*, or a metal wire which is patterned directly on the rear surface of the window 151*a*. Alternatively, the touch sensor may be integrally formed with the display. For example, the touch sensor may be disposed on a substrate of the display or within the display.

Thus, the display unit 151 can form a flexible touch screen along with the touch sensor, and in this instance, the touch screen can function as the user input unit 123 (refer to FIG. 1A). Therefore, the touch screen can replace at least some of the functions of the first manipulation unit 123a. Hereinafter, for convenience of explanation, the display unit (display module) for outputting the image and the touch sensor are collectively referred to as a touch screen 151.

The first audio output module 152a can be implemented in the form of a receiver for transferring voice sounds to the user's ear or a loud speaker for outputting various alarm sounds or multimedia reproduction sounds.

The window 151a of the display unit 151 may include a sound hole for emitting sounds generated from the first audio output module 152a. Here, the present disclosure is not limited to this and can be configured such that the sounds are released along an assembly gap between the structural bodies (for example, a gap between the window 151a and the front case 101). In this instance, a hole independently formed to output audio sounds may not be seen or hidden in terms of appearance, thereby further simplifying the appearance of the electronic device 100.

The optical output module 154 can output light for indicating an event generation. Examples of the event generated in the electronic device 100 may include a message reception, a call signal reception, a missed call, an alarm, a schedule notice, an email reception, information reception through an application, and the like. When a user's event check is sensed, the controller 180 can control the optical output unit 154 to end the output of light.

The first camera 121a can process video frames such as still or moving images obtained by the image sensor in a video call mode or a capture mode. The processed video frames can be displayed on the display unit 151 or stored in the memory 170.

The first and second manipulation units 123a and 123b are examples of the user input unit 123, which may be manipulated by a user to input a command for controlling the operation of the electronic device 100. The first and second manipulation units 123a and 123b may employ any method if it is a tactile manner allowing the user to perform manipulation with a tactile feeling such as touch, push, scroll or the like. In addition, the first and second manipulation units 123a and 123b may also employ a method of allowing the user to perform manipulation without a tactile feeling through a proximity touch, a hovering touch, or the like.

The drawings are illustrated on the basis that the first manipulation unit 123a is a touch key, but the present disclosure is not limited to this. For example, the first manipulation unit 123a can be configured with a mechanical key, or a combination of a touch key and a push key.

The content received by the first and second manipulation units 123a and 123b may be set in various ways. For example, the first manipulation unit 123a can be used by the user to input a command such as menu, home key, cancel, search, or the like, and the second manipulation unit 123b can be used by the user to input a command, such as controlling a volume level being output from the first or second audio output module 152a or 152b, switching into a touch recognition mode of the display unit 151, or the like.

Further, as another example of the user input unit 123, a rear input unit may be disposed on the rear surface of the terminal body. The rear input unit may be manipulated by a user to input a command for controlling an operation of the electronic device 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface is implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 can be implemented to have a larger screen.

Further, the electronic device 100 may include a fingerprint recognition sensor for recognizing a user's fingerprint, and the controller 180 can use fingerprint information sensed through the finger recognition sensor as an authentication means. The finger scan sensor may be installed in the display unit 151 or the user input unit 123.

The microphone 122 can receive the user's voice, other sounds, and the like. The microphone 122 may be provided at a plurality of places, and configured to receive stereo sounds.

The interface unit 160 serves as a path allowing the electronic device 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the electronic device 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a. Further, the second camera 121b may include a plurality of lenses arranged along at least one line. The plurality of lenses may also be arranged in a matrix configuration. The cameras may be referred to as an 'array camera.' When the second camera 121b is implemented as the array camera, images can be captured in various manners using the plurality of lenses and images with better qualities may be obtained. A flash 124 can be disposed adjacent to the second camera 121b. When an image of a subject is captured with the camera 121b, the flash 124 can illuminate the subject.

Further, the second audio output module 152b can be disposed on the terminal body and implement stereophonic sound functions in conjunction with the first audio output module 152a, and may be also used for implementing a speaker phone mode for call communication.

At least one antenna for wireless communication can be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 300 or a case including a conductive material may serve as an antenna.

A power supply unit 190 (refer to FIG. 1A) for supplying power to the electronic device 100 is disposed on the terminal body. The power supply unit 190 may include a battery 191 which is mounted in the terminal body or detachably coupled to an outside of the terminal body.

The battery 191 can receive power via a power source cable connected to the interface unit 160. Also, the battery 191 may be (re)chargeable in a wireless manner using a wireless charger. The wireless charging can be implemented by magnetic induction or electromagnetic resonance.

Further, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

The mobile terminal including such components can provide a term search function based on dictionary information provided on the Internet or by itself. However, a nowadays term search function is a function to input a term by a user, and to provide search information about the input term.

The present invention provides a method for providing information on a term predicted to be unfamiliar to a user, at a proper time, by using an artificial intelligence technique. In particular, FIG. 2 is a flowchart illustrating a method for providing information on a term predicted to be unfamiliar to a user, at a proper time by using an artificial intelligence technique, and FIGS. 3A and 3B are conceptual views illustrating the control method of FIG. 2.

Figure 2:
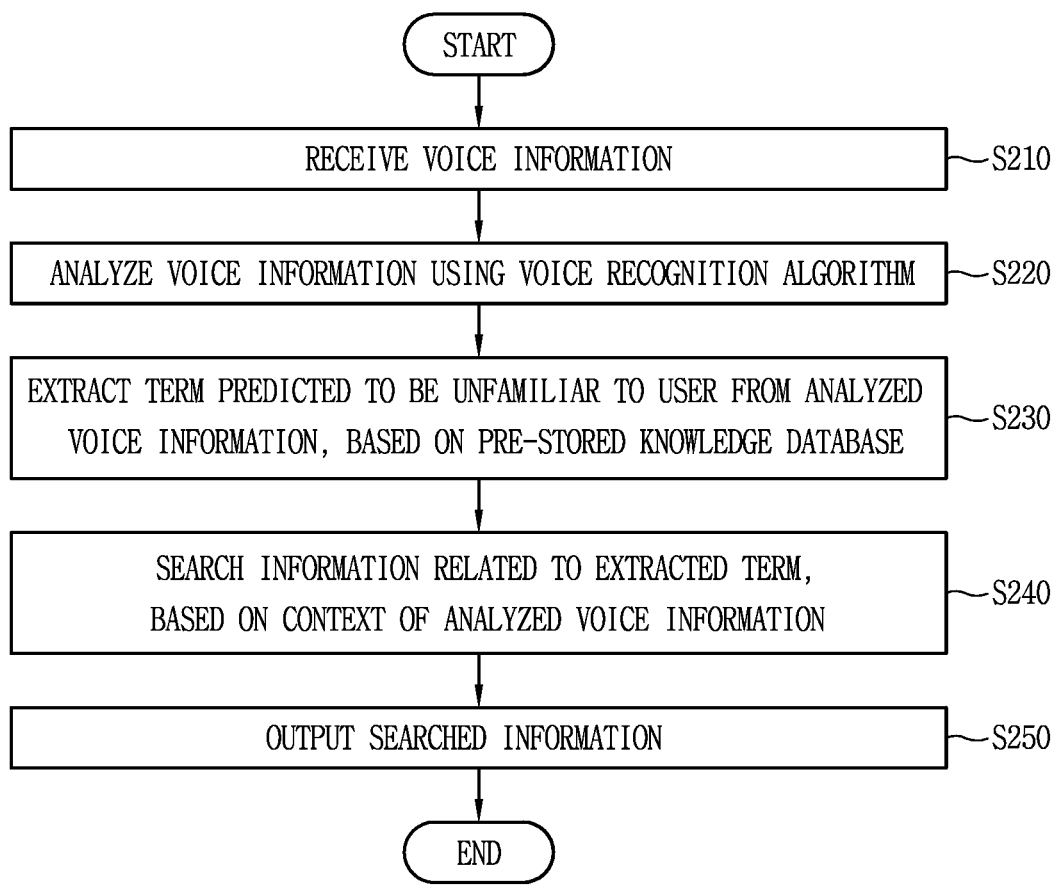
FIG. 2 is a flowchart illustrating a method for providing information on a term predicted to be unfamiliar to a user, at a proper time by using an artificial intelligence technique.
Figure 3A:
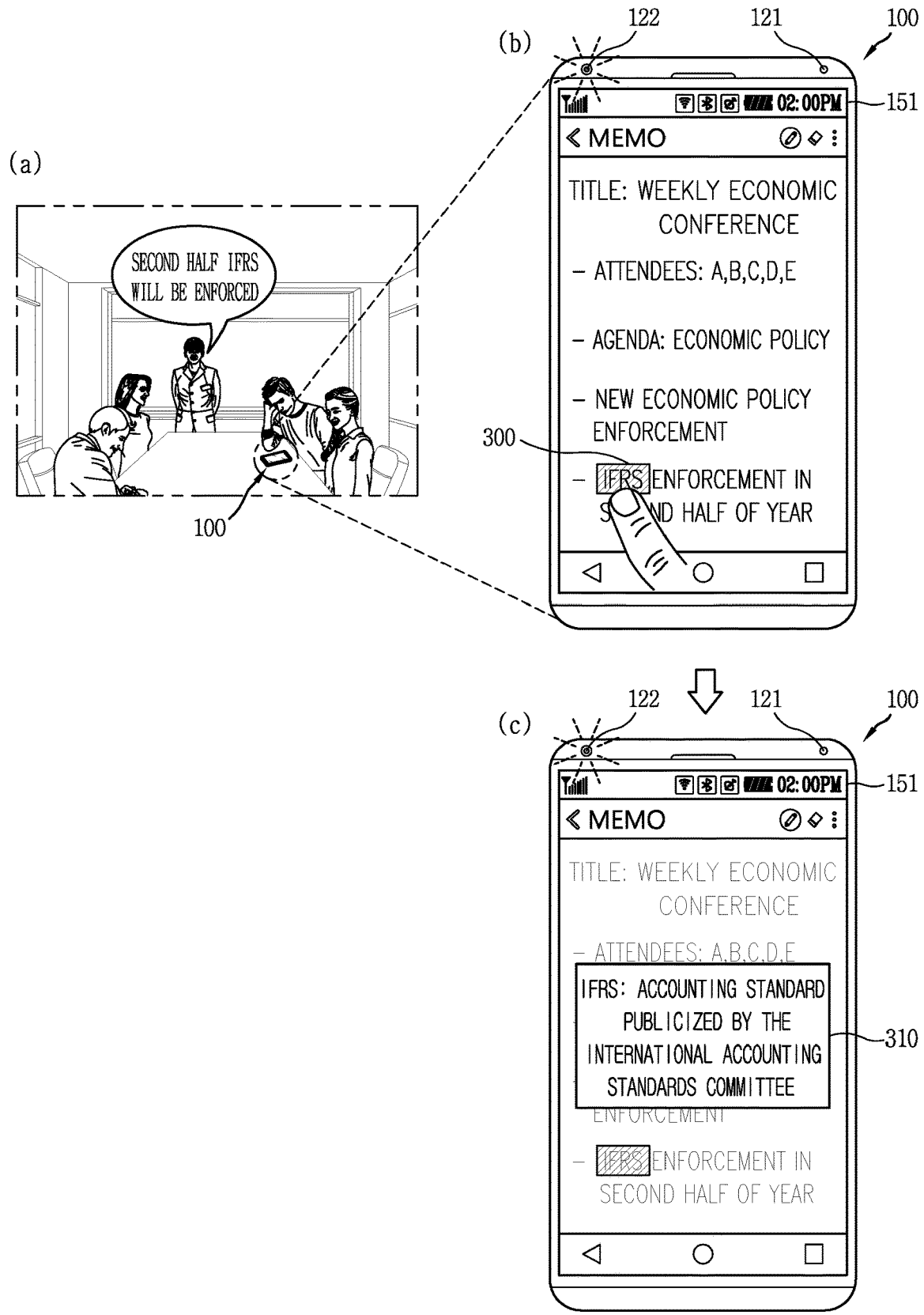
FIGS. 3A and 3B are conceptual views illustrating the control method of FIG. 2.
Figure 3B:
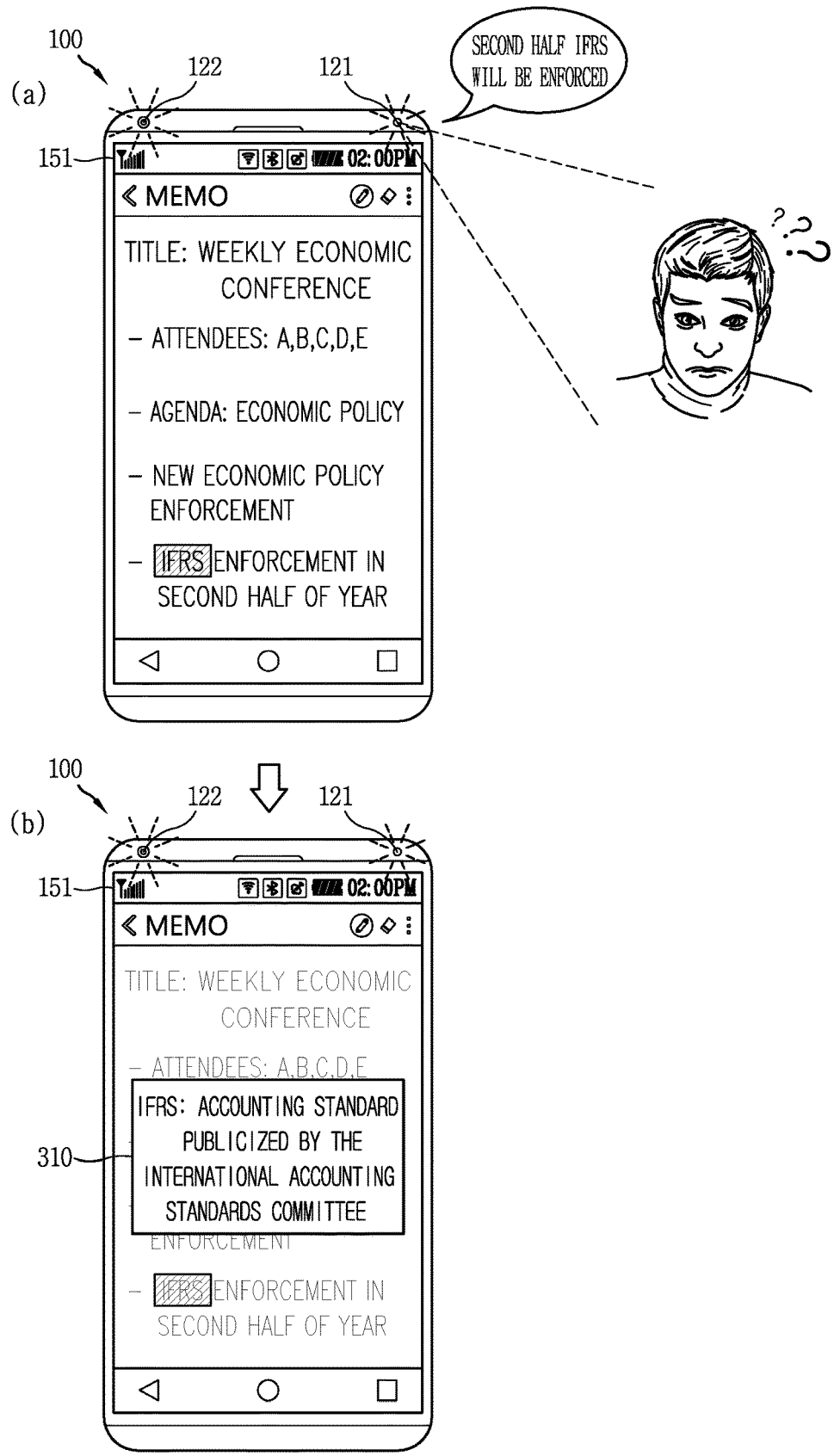

Referring to FIG. 2, the controller of the mobile terminal according to an embodiment of the present invention can receive voice information (S210). As discussed above, the mobile terminal 100 includes a microphone 122 for receiving voice information. The microphone 122 can be always activated when the mobile terminal is turned on, thereby receiving voice information occurring from the periphery of the mobile terminal.

In addition, the microphone 122 can also be activated to receive voice information based on a user's control command. In this instance, if a user's control command is not applied, the microphone 122 can be in a deactivated state where voice information cannot be received.

If a preset condition is satisfied, the microphone 122 can be automatically activated. The preset condition may be a condition related to predetermined information. For instance, if a meeting schedule at first conference room at 1:00 PM is stored, the controller 180 can automatically activate the microphone 122 when a user arrives at the first conference room at 1:00 PM. That is, the microphone can be automatically activated without a user's control command, thereby receiving voice information required by a user.

Hereinafter, the present invention will be explained in a condition that the microphone 122 is in an activated state.

The controller 180 can activate the microphone 122, and execute a voice recognition function to recognize voice information if the voice information is received from the microphone 122. The voice recognition function can recognize voice information into text information through a voice recognition algorithm, analyze the recognized text information, and control an operation of the mobile terminal based on a result of the analysis. The voice recognition algorithm is the conventional algorithm, and thus its detailed explanations will be omitted.

The voice recognition function may further include a function to store recognized voice information in the form of a text. In this instance, a user can be provided with voice information as text information.

The controller 180 can analyze voice information through a voice recognition algorithm (S220). Once voice information is received, the controller 180 can analyze the voice information as text information at a background. Thus, in the present invention, a voice recognition may be performed without a user's notice of an activated state of a voice recognition function.

The controller 180 can extract a term predicted to be unfamiliar to a user, from the analyzed voice information, based on a pre-stored knowledge database (S230). The knowledge database means a space where learned data is stored in an artificial intelligence technique. Such a knowledge database is a database where a user's personal database, a knowledge graph, a dialogue engine and policy information are stored. The knowledge database can be stored in an external server which provides an artificial intelligence technique, or be provided in the mobile terminal. Alternatively, the knowledge database can be information stored in an artificial intelligence server and information stored in the mobile terminal.

The user's personal database can include utterance history information, call information, and information stored in the mobile terminal such as emails, messages, texts and images. Further, the user's personal database can include sensing information sensed by the sensing unit of the mobile terminal, e.g., information on a usage aspect of the mobile terminal, home and/or company position information, etc.

In addition, the user's personal database can include information collected on the Internet, information on other users, etc. The controller 180 can predict various result information from voice information, based on a knowledge database. The result information may include current situation information, utterer (speaker) information, an utterance subject, etc.

For instance, the controller 180 can predict that a current situation corresponds to 'in conference', based on a knowledge database. The controller 180 can further execute a memo function to record a conference agenda as a text.

As another example, the controller 180 can detect current utterers 'A' and 'B', based on a knowledge database. In this instance, the controller 180 can store voices uttered by the 'A' and 'B' in a distinguished manner.

The controller 180 can extract a term predicted to be unfamiliar to a user, based on a knowledge database. The term predicted to be unfamiliar to a user is a term that a user does not know, or a term unacquainted to a user. For instance, the controller 180 can predict a term which does not exist in a user's personal database, as a term unfamiliar to a user. As another example, the controller 180 can predict a term frequently searched on the Internet as a term unfamiliar to a user.

The controller 180 can extract a term predicted to be unfamiliar to a user, based on user's behavior information.

The user's behavior information is information on a user's behavior expressed when he or she hears an unfamiliar term, such as a facial expression, an eyeline movement, hesitation in voice, and trembling.

For instance, when hesitation is detected from a user's voice, the controller 180 can predict a term related to the user's voice as an unfamiliar term. The hesitation may be detected based on a frequency and a sound volume of a user's voice. For instance, if a frequency of a user's voice is very high, or if a sound volume of a user's voice is very low, the controller 180 can determine that a user is hesitating.

For this, the controller 180 can capture a peripheral situation through the camera 121, and extract a term predicted to be unfamiliar to a user, based on capturing information. More specifically, the controller 180 can capture a user through the camera 121, and analyze an image of the captured user. In this instance, if a motion or a facial expression of the user corresponds to one shown when a person is perplexed, the controller 180 can determine a term received when the image has been captured, as an unfamiliar term. For instance, if a user shows a perplexed expression, the controller 180 can determine a term received through the microphone 122 when the perplexed expression has been sensed, as an unfamiliar term.

The controller 180 can search information related to the extracted term, based on a context of the analyzed voice information (S240). If the term predicted to be unfamiliar to a user is extracted, the controller 180 can search information related to the extracted term, based on context information of the analyzed voice information. The context information may include situation information of the extracted term. For instance, the context information may be a context of a voice received before or after a reception time of voice information including an extracted term. As another example, the context information may include a content of a message or an email related to an extracted term.

That is, the controller 180 can perform a meaning search for searching information related to an extracted term, based on a context of the uttered extracted term, rather than a keyword search for searching information including the extracted term. In case of the meaning search, the controller 180 can search even information not including an extracted term, as information related to the extracted term.

Further, in case of the meaning search, the controller 180 can determine a search range of information related to an extracted term, based on context information. The search range may be a search database. The search database can be a database stored in a web server, and a database stored in the memory of the mobile terminal. The database can be implemented in the form of an ontology, not in the form of the conventional table where keywords are mapped with each other.

More specifically, the controller 180 can determine one search range between a first range for searching summary information and a second range for searching summary information and detailed information, based on context information. For instance, if it is determined that summary information is required, the controller 180 can perform a search within a first range based on context information.

The controller 180 can provide different type of information related to an extracted term, based on context information. For instance, if a user does not know 'Ann', the controller 180 can provide an image of the 'Ann' as a search result. Further, if a user wants to know a presentation image of 'Ann' whom the user knows, the controller 180 can provide the presentation image of the 'Ann'.

While questions and keywords are mapped with each other for the meaning search, a resource description framework (RDF) and a web ontology language (WOL) may be used. If information related to the extracted term is searched, the controller 180 can output the searched information (S250).

If information related to the extracted information is searched, the controller 180 can output notification information indicating the search. Thus, a user can recognize that the related information can be visually checked.

The notification information may be output in at least one of visible, audible and tactile manners. For instance, the notification information may be output in the form of a pop-up window on the touch screen 151. Alternatively, the notification information may be output in the form of light through the optical output unit. If information related to the extracted term is searched, the controller 180 can output the searched information to the touch screen 151.

If the information related to the extracted term is searched, the controller 180 can immediately output the searched information to the touch screen 151. Alternatively, the controller 180 can output the information related to the extracted term to the touch screen 151, based on a user's control command. For instance, the controller 180 can output the information related to the extracted term to the touch screen 151, based on a touch input applied to notification information.

Alternatively, the controller 180 can output the information related to the extracted term to the touch screen 151, if a preset condition is satisfied. The preset condition may be a condition of a situation where visual information can be checked. For instance, if it is determined that a conference has ended or it is a pause time, the controller 180 can output, to the touch screen 151, notification information indicating that information or search information related to the extracted term exists.

Thus, in the present invention, since visual information is not output in a situation where a user cannot check visual information, user's unnecessary attention is not required. Further, in the present invention, since visual information is provided in a situation where a user can check visual information, information may be provided at a proper time.

The controller 180 can collect situation information through the sensing unit 130, in order to determine a situation where visual information can be checked. For instance, the controller 180 can capture a peripheral image through the camera 121. Further, the controller 180 can sense a distance between a user and the mobile terminal. Further, the controller 180 can sense a moving speed of the mobile terminal.

The controller 180 can determine a situation where a user can check visual information, by synthesizing sensing information sensed through the sensing unit 140. For instance, the controller 180 can determine a situation where visual information can be checked, if a distance between a user and the mobile terminal during a call is more than a predetermined value. As another example, the controller 180 can determine a situation where visual information can be checked, if a moving speed of the mobile terminal is less than a reference speed.

The touch screen 151 of the mobile terminal according to an embodiment of the present invention may be in one of a non-driving state where an entire output region is not illuminated, a low power driving state where specific information is always output to a partial region, and a driving state where an entire output region is illuminated. The non-driving state is when visual information cannot be output because an entire output region is not illuminated. The driving state is when visual information is output because an entire output region is illuminated.

The low power driving state means when specific information is output to a partial output region rather than an entire output region, as the touch screen 151 is driven at a low power. The specific information is set by a user, and may be at least one of time information, day information and notification information.

In a low power driving state of the touch screen 151, a partial output region is illuminated for display of visual information, and the remaining region is not illuminated. Here, a brightness of a lamp is lower than that in a driving state. The position of the partial output region where visual information is displayed can also be changed at random. This prevents an afterimage of specific information from being displayed on the touch screen 151.

In the low power driving state of the touch screen 151, if a term predicted to be unfamiliar to a user is sensed among voice information received through the microphone 122, the controller 180 can output notification information related to the unfamiliar term. Further, the controller 180 can output information related to an unfamiliar term, in response to a touch input applied to notification information related to the unfamiliar term. Thus, in the present invention, even in the low power driving state of the touch screen 151, information required by a user can be immediately provided.

A prediction operation of the mobile terminal is an operation of the mobile terminal to regard a situation having a highest real situation probability among various situations indicated by voice information, as a current situation. Accordingly, the mobile terminal may erroneously perform the prediction operation according to a situation.

The controller 180 can accumulate history information indicating whether a user has viewed related contents, with respect to a term predicted to be unfamiliar to a user. More specifically, the controller 180 can determine a term as an unfamiliar one if a user has viewed related contents. Further, the controller 180 can not determine a term as an unfamiliar one if a user has not viewed related contents. And the controller 180 can store the accumulated history information in a knowledge database, and then may utilize the history information later when determining a term predicted to be unfamiliar to a user. Thus, in the present invention, as information related to a user is accumulated more, a prediction result may be provided with a higher accuracy.

So far, a method for providing information related to an unfamiliar term has been explained. Hereinafter, the aforementioned control method will be explained in more detail with reference to the attached drawings.

Referring to FIG. 3A(a), a user can be in a meeting with a plurality of members. The controller 180 can receive voice information uttered by the members through the microphone 122. As shown in FIG. 3A(b), if a meeting situation is sensed, the controller 180 can further execute a memo function in order to record a meeting content as a text. The controller 180 can sense a meeting situation based on a recognition result of predetermined information or voice information. Once the memo function is executed, the controller 180 can convert voice information received during the meeting into a text. Then, the controller 180 can generate summary information on the converted text, and may store the summary information as memo information.

The controller 180 can sense a term predicted to be unfamiliar to a user, while receiving voice information through the microphone 122. For instance, the controller 180 can receive voice information including a term 'IFRS' through the microphone 122. In this instance, the controller 180 can determine whether the term 'IFRS' exists in a pre-stored knowledge database. If the term 'IFRS' does not exist, the controller 180 can predict the term as a term unfamiliar to a user. If history information indicating the term 'IFRS' has been searched exists in the pre-stored knowledge database, the controller 180 can predict the term as a term unfamiliar to a user.

The controller 180 can add the term 'IFRS' predicted to be unfamiliar to a user, to memo information. Here, the controller 180 can display the term predicted to be unfamiliar to a user, in a visually-distinguished manner from remaining memo information. For instance, as shown in FIG. 3A(b), the controller 180 can highlight the term 'IFRS' 300 such that the term may be visually-distinguished from remaining information.

The controller 180 can change a highlighting effect according to a user's unfamiliar degree with respect to a term. For instance, in case of a firstly-received term, the controller 180 can provide a highlighting effect in red. As another example, in case of a term of which meaning is not searched by a user even if the term has been already received, the controller 180 can provide a highlighting effect in orange. As another example, in case of an important term, the controller 180 can provide a highlighting effect in green.

If a term predicted to be unfamiliar to a user is sensed, the controller 180 can perform a meaning search to search information related to the term. Referring to FIG. 3A(c), if a touch input is applied to a term predicted to be unfamiliar to a user, the controller 180 can output information 310 related to the term.

The controller 180 can predict a term unfamiliar to a user based on user's behavior information, not based on a knowledge database. For instance, as shown in FIG. 3B(a), the controller 180 can capture a user's facial image through the camera 121. If the user's facial image corresponds to a perplexed expression, the controller 180 can determine that currently-received voice information includes an unfamiliar term.

The controller 180 can extract a term received when a perplexed expression has been captured, as an unfamiliar term. Alternatively, the controller 180 can extract a term predicted to be unfamiliar to a user, based on a knowledge database among voice information received when a perplexed expression has been captured.

Likewise, as shown in FIGS. 3B(a) and (b), the controller 180 can output a term 300 predicted to be unfamiliar to a user, to the touch screen 151 in a highlighting manner. Then, the controller 180 can output information 310 related to the term, to the touch screen 151, when a user's perplexed expression has been sensed. Thus, in the present invention, user's desired information may be immediately provided at a proper time, without a user's manipulation.

So far, a method for detecting a term unfamiliar to a user and effectively providing information related to the term has been explained. With such a configuration, in the present invention, information required by a user can be provided at a proper time in a proper form.

Figure 4A:
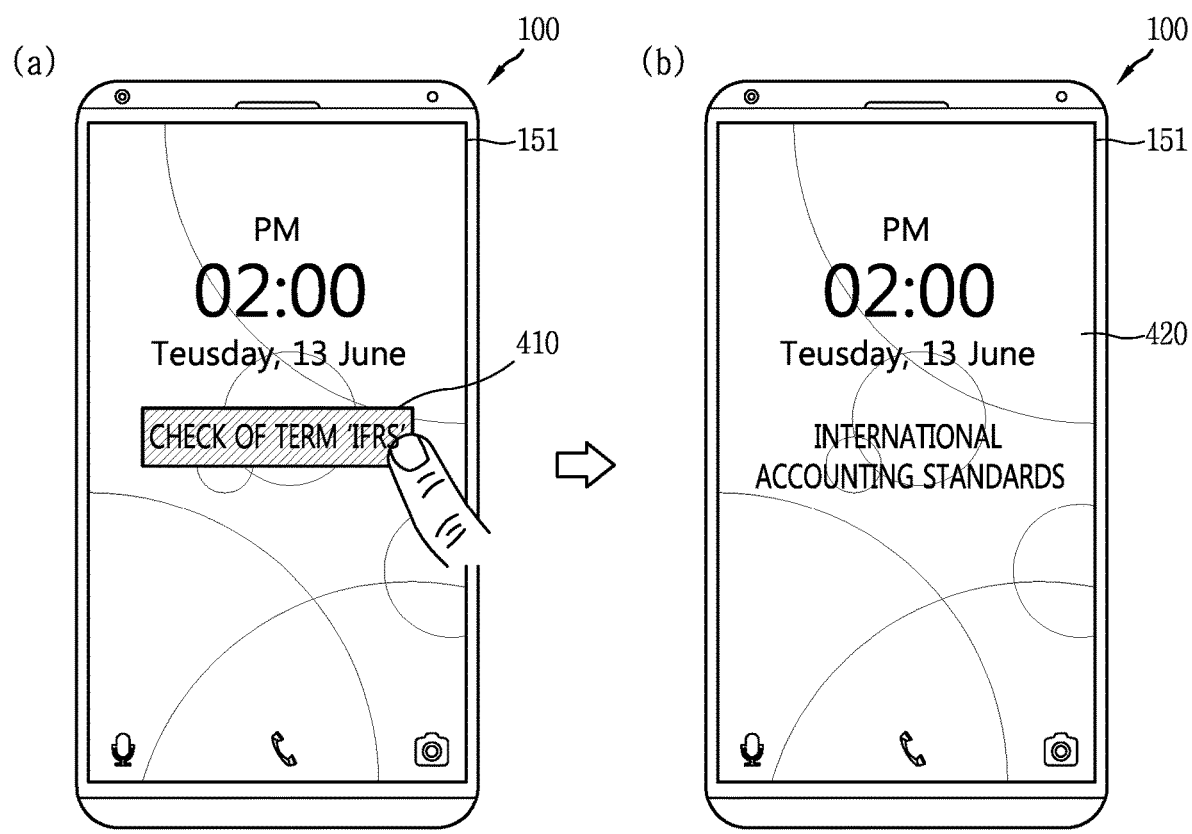
FIGS. 4A and 4B are views illustrating a method for providing term-related information to a touch screen which is in a low power driving state.
Figure 4B:
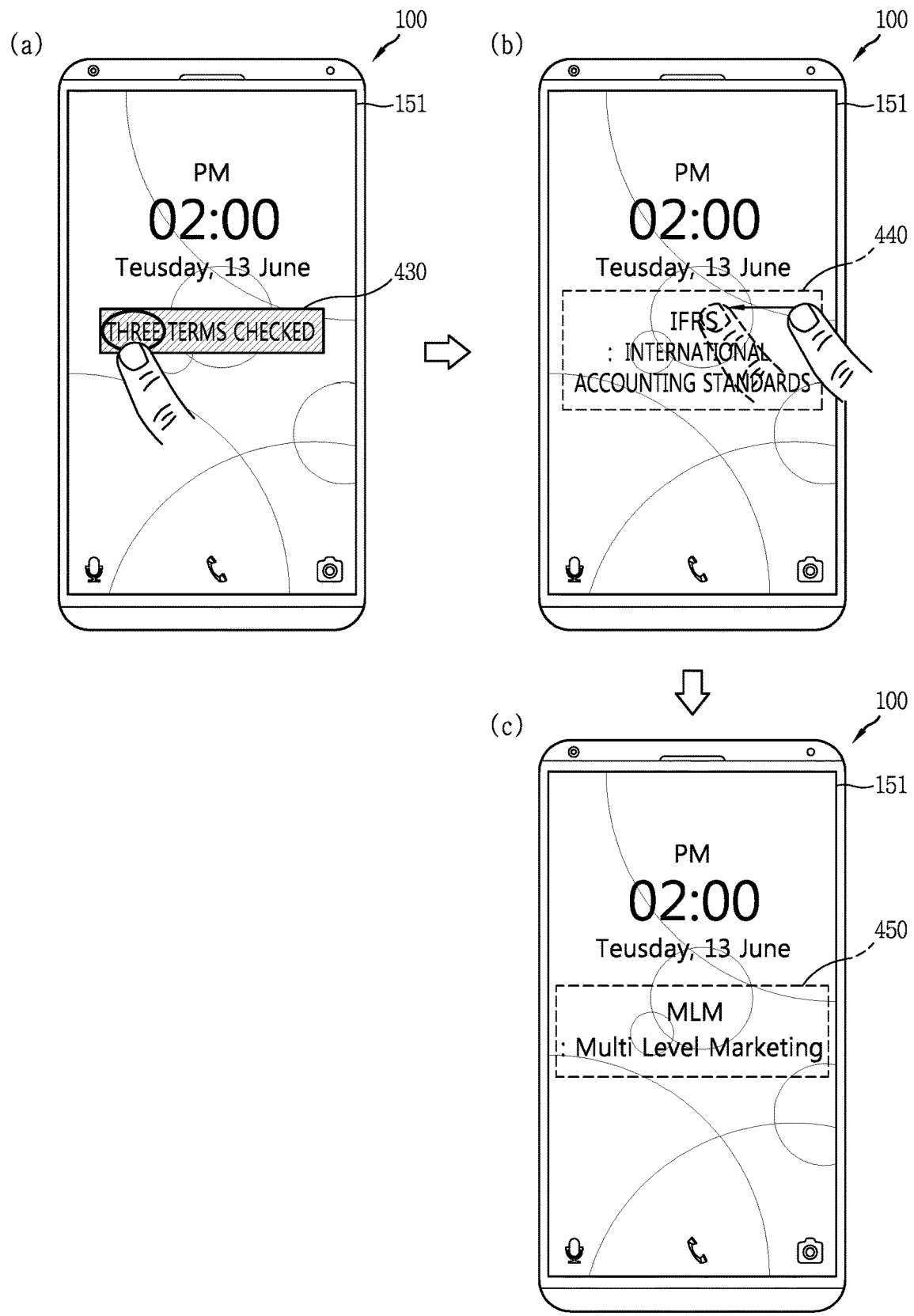

Hereinafter, a method for providing information related to a term predicted to be unfamiliar to a user, by utilizing the touch screen which is driven at a low power will be explained. In particular, FIGS. 4A and 4B are views illustrating a method for providing term-related information to the touch screen which is in a low power driving state.

The touch screen 151 of the mobile terminal according to an embodiment of the present invention can be in a low power driving state. If the mobile terminal is in a locked state where reception of a user's control command is restricted, the touch screen 151 can be driven at a low power such that specific information may be displayed on one region thereof.

Even in the locked state of the mobile terminal, the controller 180 can receive voice information occurring from the periphery of the mobile terminal through the microphone. The controller 180 can analyze the received voice information based on a voice recognition algorithm. Then, the controller 180 can extract a term predicted to be unfamiliar to a user, from the analyzed voice information.

Once the unfamiliar term is extracted, the controller 180 can output, to the touch screen 151, notification information 410 indicating that the unfamiliar term has been extracted. As shown in FIG. 4A(a), the notification information 410 can be output in a low power driving state of the touch screen 151.

As shown in FIG. 4A(b), in response to a touch input applied to the notification information 410, the controller 180 can output information 420 related to the unfamiliar term, to the touch screen 151. In this instance, the touch screen 151 may be also in a low power driving state. Thus, in the present invention, in a situation where it is difficult to turn on the touch screen 151, information related to an unfamiliar term can be provided to a user without entirely turning on the touch screen 151.

The controller 180 can extract a plurality of unfamiliar terms. As shown in FIG. 4B(a), the controller 180 can output notification information 430 indicating that a plurality of unfamiliar terms have been searched, to the touch screen 151 which is driven at a low power. The notification information 430 may have a different size and thickness according to the number of unfamiliar terms. Alternatively, the notification information 430 may include the number of unfamiliar terms.

As shown in FIGS. 4B(a) and (b), based on a touch input applied to the notification information 430, the controller 180 can output information 440 related to a specific term among the plurality of unfamiliar terms. Here, the specific term can be extracted from voice information received the most recently.

Based on a swipe input applied to the specific term-related information 440, the controller 180 can sequentially output information related to the plurality of unfamiliar terms. Here, the controller 180 can sequentially output information in order of a term extracted the most recently.

For instance, as shown in FIG. 4B(c), based on a swipe input applied to the specific term-related information 440, the controller 180 can output information 450 related to another term rather than the specific term. With such a configuration, a user can be conveniently provided with information related to an unfamiliar term, without illuminating the touch screen 151.

The notification information indicating that there exists information related to an unfamiliar term can disappear from the touch screen 151, if a user's touch input is not applied for a preset time. Further, the information related to an unfamiliar term can be output for a predetermined time, and then automatically disappear. Thus, a user needs not view unnecessary information which has been already checked.

Figure 5A:
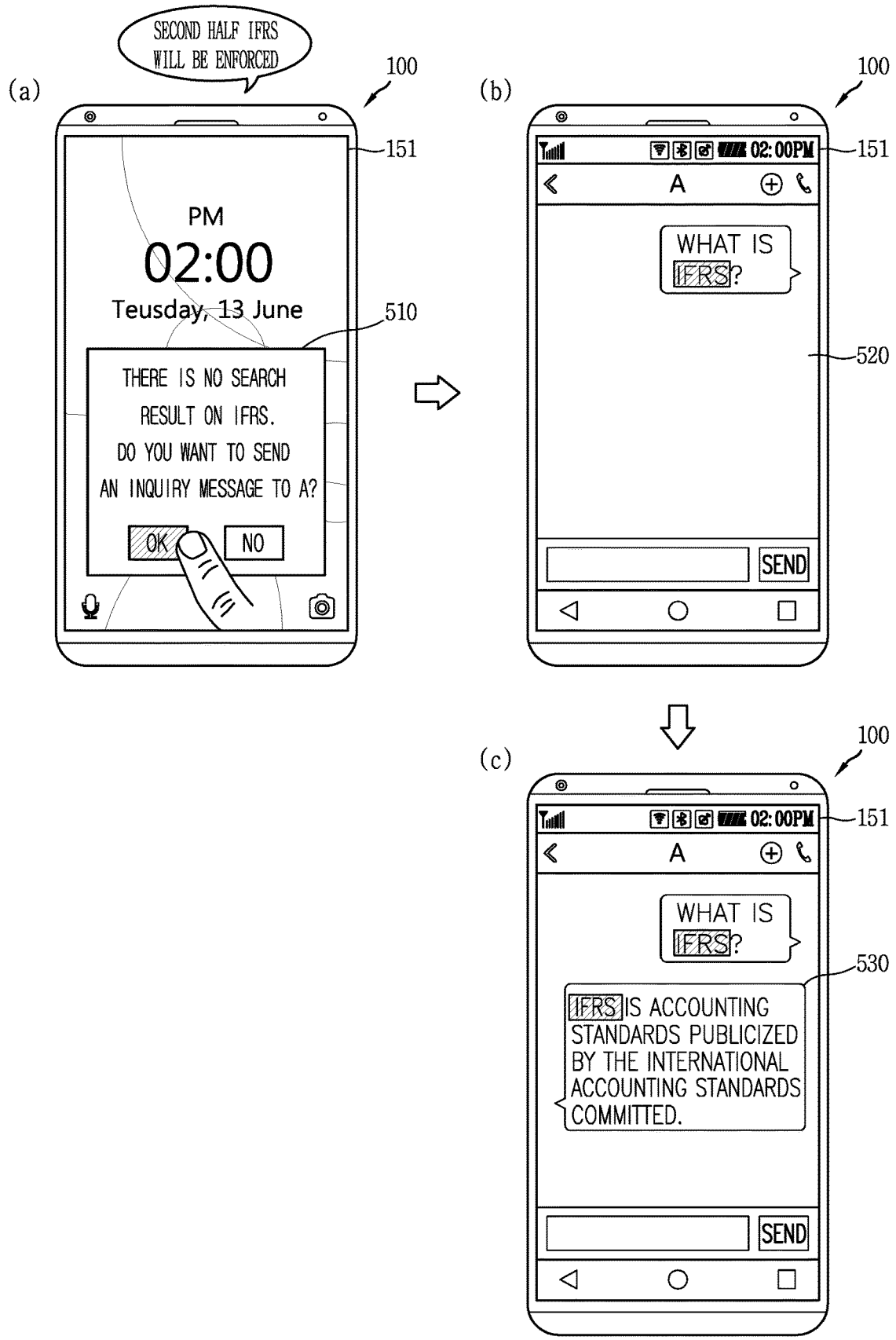
FIGS. 5A and 5B are conceptual views illustrating a method for sending an inquiry message to inquire information on an unfamiliar (unacquainted) term.
Figure 5B:
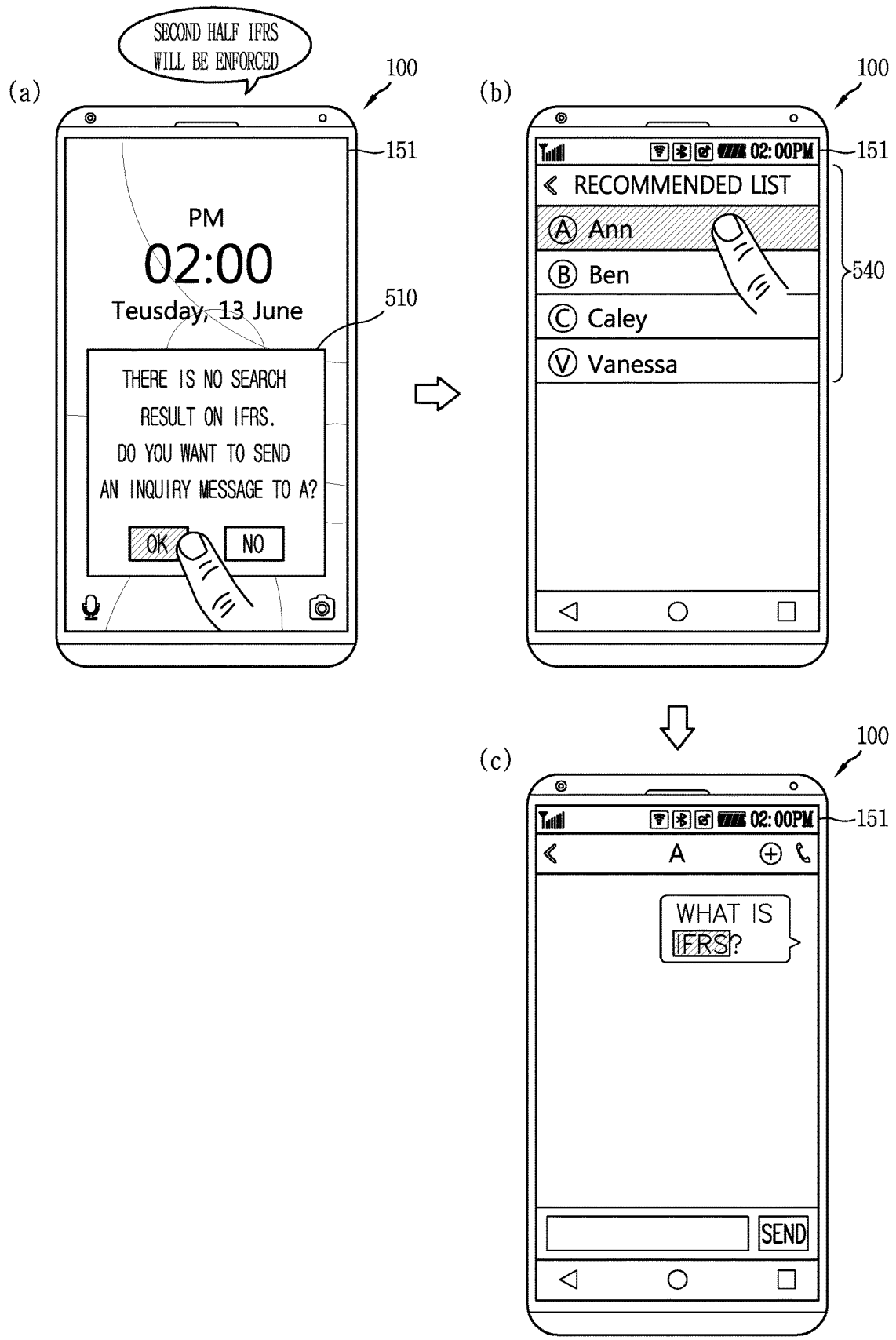

Hereinafter, will be explained a method for sending an inquiry message when information related to an unfamiliar term is not searched based on a meaning search. In particular, FIGS. 5A and 5B are conceptual views illustrating a method for sending an inquiry message to inquire information related to an unfamiliar term.

The controller 180 can search information related to an unfamiliar term based on a meaning search. If there is no proper information related to an unfamiliar term, the controller 180 can send an inquiry message with respect to the unfamiliar term. The inquiry message is a message including a content inquiring about a meaning of the unfamiliar term.

The controller 180 can send the inquiry message to a specialist who has a professional knowledge about the unfamiliar term. The controller 180 can search for a specialist who has a professional knowledge about the unfamiliar term, based on a knowledge database. The specialist may be a person who has sent a reply message having a high correct answer rate to a previous inquiry message, a person who has a high correct answer rate through web data, a person in charge of a related task, a person who has sent or received an email and a message including related contents, etc. The correct answer rate can be calculated based on at least one of a knowledge database, social network service (SNS) data related to contact information, and a context of voice information including a term predicted to be unfamiliar to a user.

For instance, the controller 180 can search a person corresponding to a specific contact information related to an unfamiliar term, among a plurality of contact information, as a specialist. The controller 180 can send an inquiry message to a person predicted to immediately make a reply message to the inquiry message. The controller 180 can determine a person predicted to immediately make a reply message, based on a reply message sending time. For instance, the controller 180 can set contact information having a shortest reply message sending time, among a plurality of contact information, as another party.

Referring to FIG. 5A(a), the controller 180 can output a pop-up window 510 indicating that an inquiry message can be sent, if proper information related to an unfamiliar term does not exist. As shown in FIG. 5A(b), the controller 180 can send an inquiry message inquiring a meaning of an unfamiliar term, to a specialist about the unfamiliar term, or a person which can immediately answer, based on a touch input applied to the pop-up window 510. As shown in FIG. 5A(c), if a reply message 530 to the inquiry message 520 is received, the controller 180 can output a content of the reply message 530 to the touch screen 151.

The controller 180 can determine a person who sends an inquiry message according to a user's selection. As shown in FIGS. 5B(a) and (b), if an inquiry message transmission request is received, the controller 180 can output, to the touch screen 151, a list 540 including a plurality of contact information to which an inquiry message can be sent. The plurality of contact information to which an inquiry message can be sent may be contact information of persons who have professional knowledge, or contact information of persons who can immediately send a reply message.

Referring to FIG. 5B(c), if a specific person is selected by a user, the controller 180 can send an inquiry message based on contact information of the specific person. Thus, in the present invention, a user can send an inquiry message to his or her desired person.

If a reply message to the inquiry message is received, the controller 180 can output the inquiry message and the reply message together. The controller 180 can highlight point information related to the predicted term among contents of the reply message.

So far, a method for acquiring information related to an unfamiliar term through an inquiry message has been explained. With such a configuration, the controller 180 can acquire professional knowledge more conveniently by sending an inquiry message with respect to information related to an unfamiliar term. This enhances user's convenience.

Figure 6:
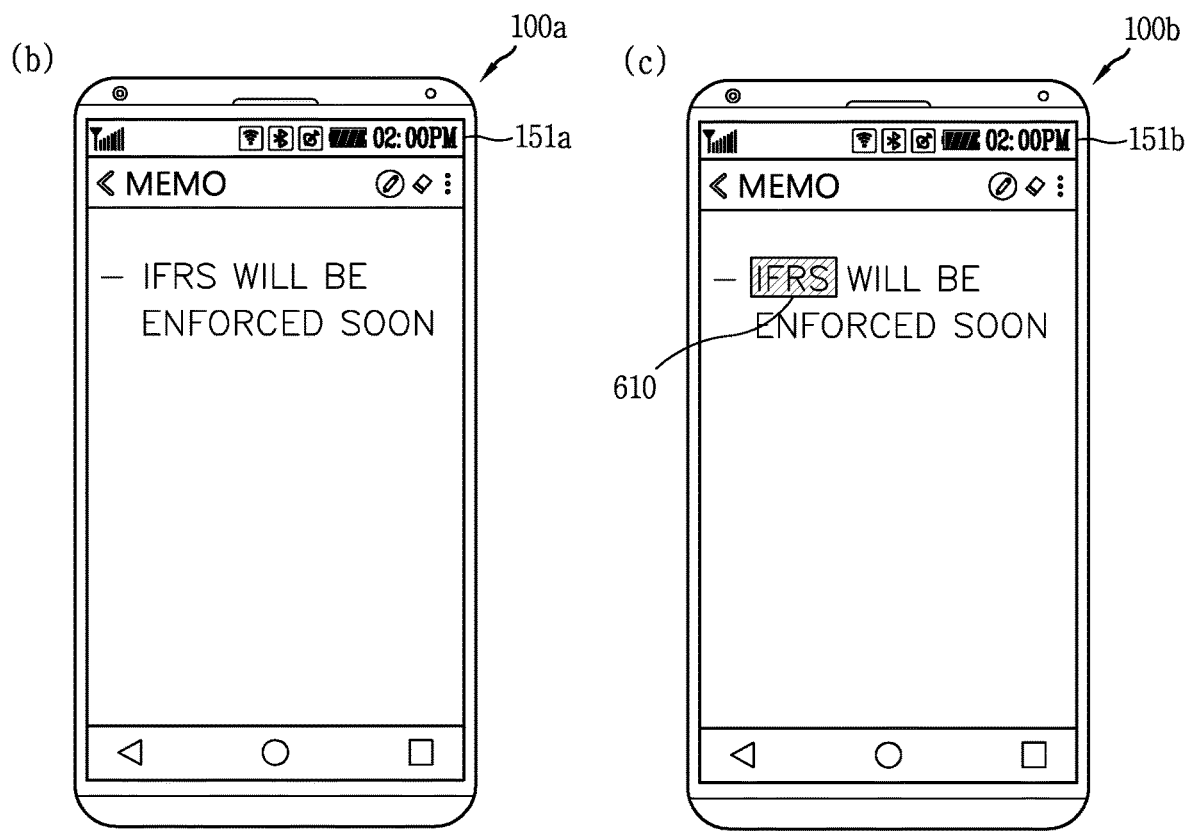
FIG. 6 is a conceptual view illustrating a process of capturing surrounding environment information using a camera, and of extracting a term expected to be unfamiliar to a user from the surrounding environment information.

Hereinafter, will be explained a method for extracting information on a term predicted to be unfamiliar to a user, from surrounding environment information of the mobile terminal. In particular, FIG. 6 is a conceptual view illustrating a process of capturing surrounding environment information using a camera, and of extracting a term expected to be unfamiliar to a user from the surrounding environment information.

As shown in FIG. 6(a), the mobile terminal according to an embodiment of the present invention can be connected to an external camera 600 which can capture an image with 360°, for wireless or wired communication. The external camera 600 may capture user's surrounding environment, and may send the captured image to the user's mobile terminal in real time.

The controller 180 can analyze the image received from the external camera 600, and extract a term predicted to be unfamiliar to a user from the image. As shown in FIG. 6(b), if voice information related to the unfamiliar term is not received from the image, the controller 180 can output information related to the term to the touch screen 151.

Here, the unfamiliar term, and information related to the unfamiliar term can be stored in the memory as memo information. The unfamiliar term can be highlighted to be output to the touch screen.

As shown in FIG. 6(a), the external camera 600 can be connected to a plurality of users' mobile terminals 100a, 100b. A controller of each of the mobile terminals can differently determine a term predicted to be unfamiliar to a user, based on user's behavior information. More specifically, the controller 180a of the first mobile terminal 100a can determine that 'IFRS' is not an unfamiliar term, based on user's behavior information (e.g., a non-perplexed expression). In this instance, as shown in FIG. 6(b), the controller 180a can output the 'IFRS' to a touch screen 151a without a highlight effect.

On the contrary, the controller 180b of the second mobile terminal 100b can determine that 'IFRS' is an unfamiliar term, based on user's behavior information (e.g., a perplexed expression). In this instance, as shown in FIG. 6(c), the controller 180b can output the 'IFRS' 610 to a touch screen 151b with a highlight effect.

In the aforementioned description, an image captured by the external camera is received. However, the present invention is not limited to this. That is, the mobile terminal may be operated in the same manner by using an image captured by the camera provided at the mobile terminal.

So far, a method for extracting a term unfamiliar to a user from a surrounding environment, and for providing information related to the unfamiliar term has been explained. With such a configuration, in the present invention, a term unfamiliar to a user can be extracted from visual information which exists in a surrounding environment, and relevant information may be provided more conveniently.

Hereinafter, a method for effectively providing information related to an unfamiliar term to a proper position at a proper time, according to user's situation information will be explained. In particular, FIGS. 7A to 7C are conceptual views showing a method for effectively providing information related to an unfamiliar term, to a proper position at a proper time, according to user's situation information.

If an unfamiliar term is extracted, the controller 180 can not immediately output information related to the unfamiliar term. Rather, the controller 180 can determine an output time of the information related to the unfamiliar term, based on user's situation information. The user's situation information indicating whether a user is in a state that he or she can check visual information. That is, when a user is in a state that he or she can check visual information, the controller 180 can output information related to an unfamiliar term.

Figure 7A:
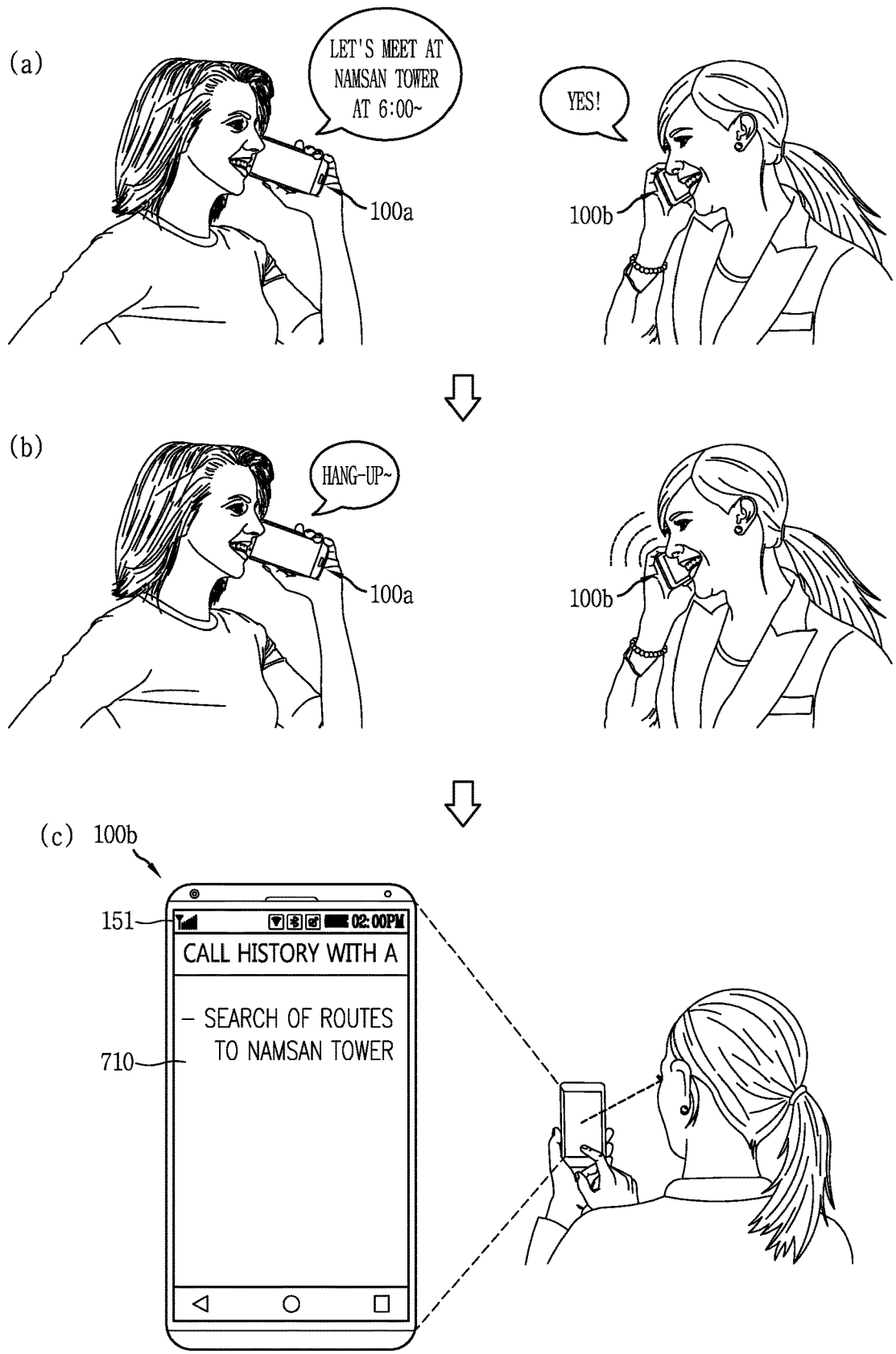
Figure 7C:
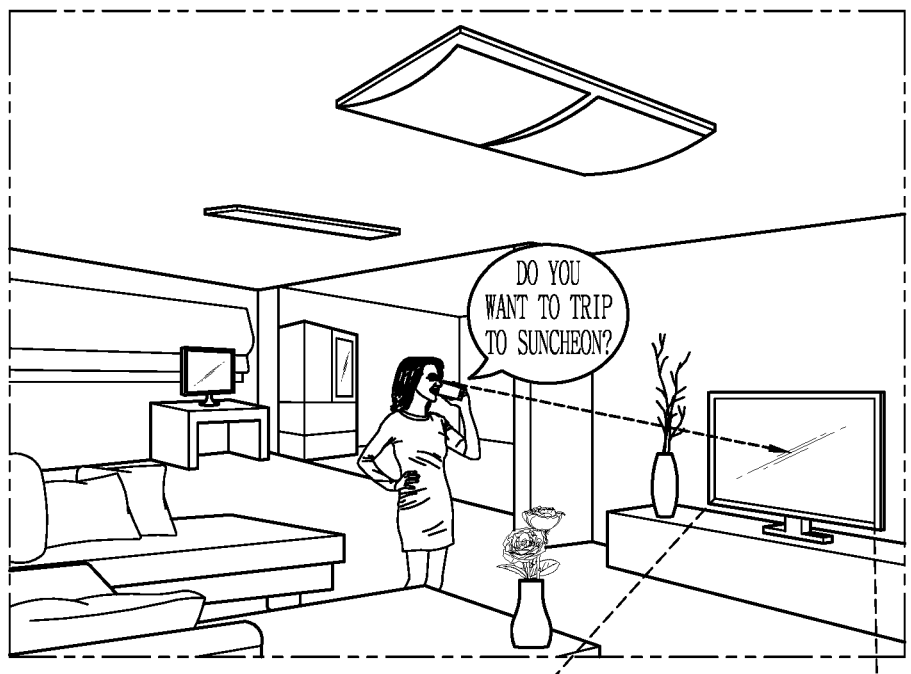

For instance, referring to FIG. 7A(a), a first mobile terminal 100a and a second mobile terminal 100b can execute a voice communication function therebetween. A controller 180b of the second mobile terminal 100b can extract a term 'Namsan Tower' from voice information occurring during a call.

The controller 180b can search for information related to the term 'Namsan Tower'. However, the controller 180b can detect a call termination time without immediately outputting the information related to the term 'Namsan Tower'. As shown in FIG. 7A(b), the controller 180b can detect a call termination time if voice information 'Hang up' is received. In this instance, the controller 180b can output notification information indicating the information related to the term 'Namsan Tower', in a vibration manner.

As shown in FIG. 7A(c), if a distance between a user and the touch screen 151 is more than a preset value, the controller 180b can determine that the user can check visual information. And the controller 180b can output the information related to the term 'Namsan Tower' to the touch screen 151. Thus, in the present invention, information required by a user can be provided at a proper time.

In addition, if the information related to the term 'Namsan Tower' is searched during a voice call, the controller 180b can execute a speaker phone function to induce a user to check the touch screen 151. More specifically, if the information related to the term 'Namsan Tower' is searched, the controller 180b can generate vibrations. The speaker phone function performs a voice call at a short distance through a speaker.

Then, the controller 180b can execute the speaker phone function when a preset motion of the terminal body is sensed. The preset motion may be a user's motion to detach the mobile terminal from an ear. Similarly, the present invention can provide search information by executing an earphone function which performs a voice call using an earphone, and a Bluetooth headset function which performs a voice call using a Bluetooth headset.

Once the speaker phone function is executed, the controller 180b can output the information related to the term 'Namsan Tower' to the touch screen 151. Thus, a user can check the information related to the term 'Namsan Tower' while continuously performing a voice call in a speaker phone mode. In addition, the controller 180b can output the information related to the term 'Namsan Tower' to the touch screen 151 when another party does not speak during a voice call.

If a user is driving a vehicle, the controller 180 can determine an output position of the information related to the term 'Namsan Tower' according to a driving speed of the vehicle. Referring to FIG. 7B(a), the controller 180 can extract the term 'Namsan Tower'. In this instance, the controller 180 can output the information related to the term 'Namsan Tower' to a display unit 720 positioned at a user's front side, if the vehicle is driving at a preset speed (v1). The display unit 720 positioned at a user's front side may be a head up display of a vehicle. If the vehicle is temporarily stopping (v=0), the controller 180 can output the information related to the term 'Namsan Tower' to the touch screen 151 of the user's mobile terminal. With such a configuration, a user can be effectively provided with relevant information without being hindered in driving a vehicle.

In addition, the controller 180 can determine an output position of information related to an unfamiliar term, according to whether a fellow passenger is in a driving vehicle or not. For instance, if there is a fellow passenger, the controller 180 can output the information related to an unfamiliar term, to the touch screen 151 of the mobile terminal. Further, if there is no fellow passenger, the controller 180 can output the information related to an unfamiliar term, to a display unit disposed at a user's front side.

In addition, if a radio is not playing while a user is driving a vehicle, the controller 180 can output information related to 'Namsan Tower' in an audible manner through a speaker. Further, if a radio is playing, the controller 180 can output information related to 'Namsan Tower' in a visible manner. If a user cannot see the touch screen 151, the controller 180 can output information related to an unfamiliar term, to an external display unit positioned near the mobile terminal.

Referring to FIG. 7C, if a user cannot see the touch screen 151 during a voice call, the controller 180 can search an external display unit positioned near the mobile terminal. The external display unit can be an electronic device which can communicate with the mobile terminal.

If there is a TV near a user, the controller 180 can perform a communication connection with the TV. And the controller 180 can send information 740 related to an unfamiliar term to the TV. In this instance, the TV can output the information 740 related to an unfamiliar term. Thus, a user can check the information related to an unfamiliar term while continuously performing a voice call. With such a configuration, in the present invention, a user can be provided with information related to an unfamiliar term, at a proper position at a proper time.

Hereinafter, a method for providing a message content-related image based on user's behavior information will be explained. In particular, FIG. 8 is a view illustrating a method for providing a message content-related image based on user's behavior information.

Figure 8:
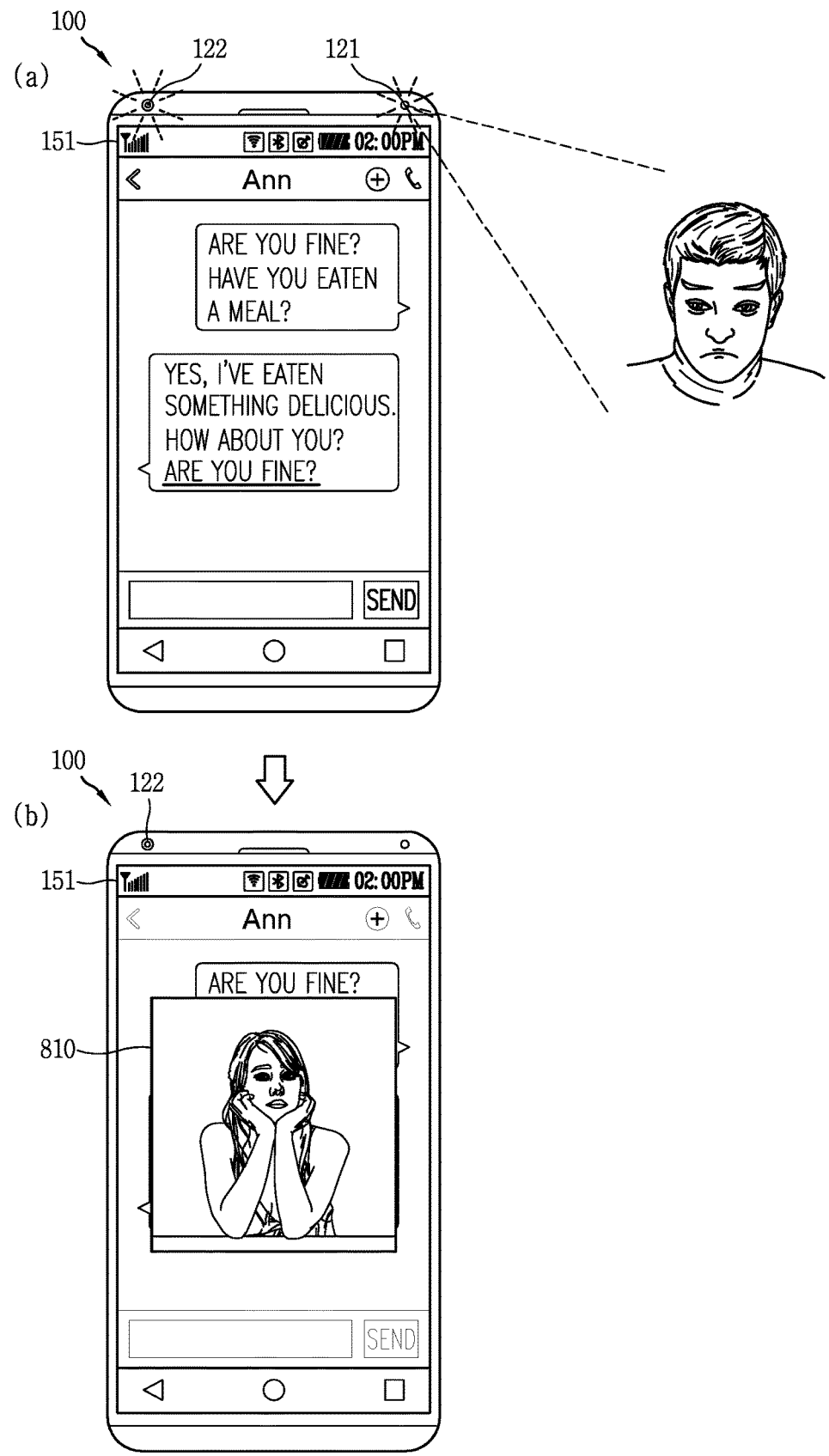
FIG. 8 is a view illustrating a method for providing a message content-related image based on user's behavior information.

As shown in FIG. 8(*a*), contents of messages transceived with another party may be output to the touch screen 151. Here, the controller 180 can capture a user's facial image through the camera 121. The controller 180 can analyze the user's facial image, thereby determining user's emotional information.

As shown in FIG. 8(*b*), if the user's emotional information is determined as an expression to miss another party, the controller 180 can output another party's image 810 to the touch screen 151. Here, the another party's image 810 may be an image stored in the memory 170 of the mobile terminal, or an image uploaded to an SNS web site. Thus, the controller 180 can view a most-recent image of the another party.

The controller 180 can generate a hyperlink to link a message sent from another party, to an SNS server of the another party. In this instance, the controller 180 can immediately access the another party's SNS server based on a touch input applied to the message, thereby checking user's recent activities. The hyperlink may be generated at an emotional word which arouses a user's emotion. For instance, the hyperlink may be generated at a word such as "Are you fine?", which arouses a user's longing. With such a configuration, in the present invention, a user's emotion may be checked, and an emotional content related to the user's emotion may be provided.

So far, a method for providing a message content-related image based on user's behavior information has been explained. With such a configuration, a user's emotion is recognized, and an emotional content can be provided.

In the mobile terminal according to the embodiment of the present invention, voice information occurring from the periphery of the mobile terminal can be recognized. And if it is determined that a term unfamiliar to a user is included in the recognized voice information, a semantic search with respect to the unfamiliar term can be performed to provide information required by a user. This may enhance user's convenience.

Further, in the present invention, if a term predicted to be unfamiliar to a user is sensed while a vehicle is running, information on the unfamiliar term is output to a specific display unit among a plurality of display units mounted in the vehicle, according to a driving speed of the vehicle. This allows the user to be provided with desired information without being hindered in driving the vehicle. This may enhance safety in driving.

Further, in the present invention, if a term predicted to be unfamiliar to a user is sensed during a voice call, a current state of the user can be checked such that information on the unfamiliar term may be provided at a proper time in a proper form.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a touch screen;
a microphone configured to receive voice information from a user; and
a controller configured to:
analyze the voice information using a voice recognition algorithm,
extract a term predicted to be unfamiliar to the user from the analyzed voice information based on a pre-stored knowledge database,
search for information on the extracted term based on a context of the analyzed voice information,
display the searched information on the touch screen,
drive the touch screen at a low power and display summary information indicating the mobile terminal is in a locked state,
display notification information indicating an existence of the predicted term together with the summary information, and
in response to a touch input applied to the notification information, display information on the term predicted to be unfamiliar to the user, on the touch screen being driven at the low power, wherein the extracted term is not included in the database or is a term frequently searched on the internet.

2. The mobile terminal of claim 1, wherein the knowledge database includes at least one of email information, message information, call history information and text information of the user.

3. The mobile terminal of claim 1, further comprising:
a camera configured to capture a surrounding environment,
wherein the controller is further configured to:
analyze an image of the surrounding environment captured by the camera, and
extract the term predicted to be unfamiliar to the user from the analyzed voice information, based on a result of analyzing the image.

4. The mobile terminal of claim 1, wherein the controller is further configured to:
generate minutes including the analyzed voice information, and
display the minutes on the touch screen with the term predicted to be unfamiliar to the user to be visually distinguished from other information included in the displayed minutes.

5. The mobile terminal of claim 1, wherein the controller is further configured to:
if the term predicted to be unfamiliar to the user is extracted in a plurality of terms, sequentially display information on the plurality of terms, in response to a swipe input applied to the touch screen being driven at the low power.

6. The mobile terminal of claim 1, further comprising:
a memory configured to store a plurality of contact information,
wherein the controller the controller is further configured to:
search contact information related to the term predicted to be unfamiliar to the user, among the plurality of contact information, based on text of the analyzed voice information, and
transmit an inquiry message with respect to the term predicted to be unfamiliar to the user to an external terminal corresponding to the searched contact information.

7. The mobile terminal of claim 6, wherein the controller is further configured to:
if there is no search result on the predicted term, transmit an inquiry message to the searched contact information.

8. The mobile terminal of claim 6, wherein the controller is further configured to:
if the contact information related to the term predicted to be unfamiliar to the user is searched in plurality, transmit the inquiry message to contact information estimated to have a highest correct answer rate with respect to the inquiry message.

9. The mobile terminal of claim 8, wherein the controller is further configured to:
estimate the contact information having the highest correct answer rate, based on at least one of the knowledge database, social network service (SNS) data related to the contact information, and a context of voice information including the term predicted to be unfamiliar to the user.

10. The mobile terminal of claim 8, wherein the controller is further configured to:
determine contact information to which the inquiry message is to be sent, among the plurality of contact information, based on a reply message sending time with respect to the previous inquiry message.

11. The mobile terminal of claim 6, wherein the controller is further configured to:
if a reply message to the inquiry message is received, highlight summary information related to the predicted term, among contents of the message.

12. The mobile terminal of claim 1, further comprising:
a camera configured to capture a facial image of the user and a surrounding environment image,
wherein the controller is further configured to:
extract a term predicted from the surrounding environment image captured through the camera, based on an analysis result of the facial image of the user, and
display information related to the predicted term on the touch screen.

13. The mobile terminal of claim 12, wherein the controller is further configured to:
generate memo information including the information related to the predicted term.

14. The mobile terminal of claim 1, wherein the controller is further configured to:
if the term predicted to be unfamiliar to the user is extracted from the voice information, determine an output time of a notification signal indicating information on the predicted term, based on at least one of text of the voice information and peripheral situation information.

15. The mobile terminal of claim 14, wherein the controller is further configured to:
output the notification signal in at least one of visible, audible and tactile manners, based on the peripheral situation information.

16. The mobile terminal of claim 14, wherein the controller is further configured to:
transmit the notification signal to an external terminal having a display, based on the peripheral situation information, such that the notification signal is displayed on the display of the external terminal.

17. A method of controlling a mobile terminal, the method comprising:
receiving, via a microphone voice information from a user;
analyzing, via a controller, the voice information using a voice recognition algorithm;
extracting, via the controller, a term predicted to be unfamiliar to the user from the analyzed voice information based on a pre-stored knowledge database;
searching, via the controller, for information on the extracted term based on a context of the analyzed voice information;
displaying the searched information on a touch screen;
driving the touch screen at a low power and display summary information indicating the mobile terminal is in a locked state;
displaying notification information indicating an existence of the predicted term together with the summary information; and
in response to a touch input applied to the notification information, displaying information on the term predicted to be unfamiliar to the user, on the touch screen being driven at the low power,
wherein the extracted term is not included in the database or is a term frequently searched on the internet.

18. The method of claim 17, wherein the knowledge database includes at least one of email information, message information, call history information and text information of the user.

\* \* \* \* \*